(12) United States Patent
Ohno et al.

(10) Patent No.: US 10,358,107 B2
(45) Date of Patent: Jul. 23, 2019

(54) FRONT PASSENGER SEAT AIRBAG DEVICE

(71) Applicants: TOYOTA JIDOSHA KABUSHIKI KAISHA, Toyota-shi, Aichi-ken (JP); TOYODA GOSEI CO., LTD., Kiyosu-shi, Aichi (JP)

(72) Inventors: Mitsuyoshi Ohno, Miyoshi (JP); Ikuo Yamada, Kiyosu (JP); Mikine Hayashi, Kiyosu (JP); Shun Ito, Kiyosu (JP); Takahiro Kojima, Kiyosu (JP)

(73) Assignees: TOYOTA JIDOSHA KABUSHIKI KAISHA, Toyota (JP); TOYODA GOSEI CO., LTD., Kiyosu-shi (JP)

( * ) Notice: Subject to any disclaimer, the term of this patent is extended or adjusted under 35 U.S.C. 154(b) by 105 days.

(21) Appl. No.: 15/661,570

(22) Filed: Jul. 27, 2017

(65) Prior Publication Data

US 2018/0037188 A1 Feb. 8, 2018

(30) Foreign Application Priority Data

Aug. 4, 2016 (JP) .................................. 2016-154061

(51) Int. Cl.
*B60R 21/205* (2011.01)
*B60R 21/213* (2011.01)
(Continued)

(52) U.S. Cl.
CPC .......... *B60R 21/205* (2013.01); *B60R 21/213* (2013.01); *B60R 21/231* (2013.01);
(Continued)

(58) Field of Classification Search
CPC ... B60R 21/262; B60R 21/231; B60R 21/237; B60R 21/205; B60R 21/213;
(Continued)

(56) References Cited

U.S. PATENT DOCUMENTS 5,364,125 A * 11/1994 Brown .................... B60R 21/21
280/730.2
6,398,258 B2 * 6/2002 Hamada ............. B60R 21/2171
280/739
(Continued)

FOREIGN PATENT DOCUMENTS

JP 4289066 B2 7/2009
JP 2015-231808 A 12/2015
(Continued)

*Primary Examiner* — Paul N Dickson
*Assistant Examiner* — Timothy Wilhelm
(74) *Attorney, Agent, or Firm* — Oliff PLC

(57) ABSTRACT

A front passenger seat airbag device includes a module case; a front passenger seat airbag configured such that, in a folded state, a height of a first airbag section positioned at a vehicle outer side is lower than a height of a second airbag section positioned at a vehicle inner side, and widths of the first airbag section and the second airbag section are substantially the same; an inflator disposed at a bottom side of the module case; and a raising member disposed at a bottom portion of the module case, and that raises a height of a first support face supporting the first airbag section to be higher than a height of a second support face supporting the second airbag section, such that a height of an upper face of the first airbag section is substantially aligned with a height of an upper face of the second airbag section.

10 Claims, 12 Drawing Sheets

(51) Int. Cl.
*B60R 21/232* (2011.01)
*B60R 21/2334* (2011.01)
*B60R 21/237* (2006.01)
*B60R 21/262* (2011.01)
*B60R 21/231* (2011.01)
*B60R 21/0136* (2006.01)
*B60R 21/2165* (2011.01)
*B60R 21/217* (2011.01)
*B60R 21/264* (2006.01)
*B60R 21/00* (2006.01)
*B60R 21/01* (2006.01)

(52) U.S. Cl.
CPC .......... *B60R 21/232* (2013.01); *B60R 21/237* (2013.01); *B60R 21/2334* (2013.01); *B60R 21/262* (2013.01); *B60R 21/0136* (2013.01); *B60R 21/217* (2013.01); *B60R 21/2165* (2013.01); *B60R 21/264* (2013.01); *B60R 2021/0004* (2013.01); *B60R 2021/0006* (2013.01); *B60R 2021/0009* (2013.01); *B60R 2021/0023* (2013.01); *B60R 2021/0048* (2013.01); *B60R 2021/01027* (2013.01); *B60R 2021/01286* (2013.01); *B60R 2021/23107* (2013.01); *B60R 2021/23161* (2013.01)

(58) Field of Classification Search
CPC .............. B60R 21/2334; B60R 21/232; B60R 2021/006; B60R 21/217; B60R 2021/01286; B60R 21/0136; B60R 21/264; B60R 2021/004; B60R 21/2165; B60R 2021/0009; B60R 2021/0023; B60R 2021/048; B60R 2021/01027; B60R 2021/23107; B60R 2021/23161; B60R 21/26; B60R 21/20
See application file for complete search history.

(56) References Cited

U.S. PATENT DOCUMENTS

| | | | | |
|---|---|---|---|---|
| 6,607,210 | B2* | 8/2003 | Eckert | B60R 21/233 |
| | | | | 280/732 |
| 7,055,857 | B2* | 6/2006 | Marotzke | B60R 21/206 |
| | | | | 280/736 |
| 7,121,576 | B2* | 10/2006 | DePottey | B60R 21/2171 |
| | | | | 280/728.2 |
| 7,261,320 | B2* | 8/2007 | Fredin | B60R 21/233 |
| | | | | 280/735 |
| 7,497,468 | B2* | 3/2009 | Choi | B60R 21/217 |
| | | | | 280/740 |
| 7,549,673 | B2* | 6/2009 | Suzuki | B60R 21/26 |
| | | | | 280/732 |
| 7,673,900 | B2* | 3/2010 | Yokoyama | B60R 21/205 |
| | | | | 280/732 |
| 8,608,195 | B2* | 12/2013 | Yamada | B60R 21/201 |
| | | | | 280/732 |
| 9,114,777 | B2* | 8/2015 | Fukawatase | B60R 21/232 |
| 9,126,558 | B2* | 9/2015 | Kawamura | B60R 21/213 |
| 9,248,799 | B2* | 2/2016 | Schneider | B60R 21/205 |
| 9,358,945 | B2* | 6/2016 | Yamada | B60R 21/233 |
| 9,421,935 | B2* | 8/2016 | Fukawatase | B60R 21/205 |
| 9,428,139 | B2* | 8/2016 | Yamada | B60R 21/233 |
| 9,434,344 | B2* | 9/2016 | Fukawatase | B60R 21/2338 |
| 9,505,372 | B2* | 11/2016 | Yamada | B60R 21/2338 |
| 9,522,648 | B2* | 12/2016 | Fukawatase | B60R 21/233 |
| 9,527,469 | B2* | 12/2016 | Fukawatase | B60R 21/231 |
| 2007/0057497 | A1* | 3/2007 | Frisch | B60R 21/26 |
| | | | | 280/740 |
| 2007/0222194 | A1* | 9/2007 | Harvey | B60R 21/26 |
| | | | | 280/740 |
| 2017/0028954 | A1* | 2/2017 | Sumiya | B60R 21/205 |
| 2018/0037184 | A1* | 2/2018 | Motomochi | B60R 21/201 |

FOREIGN PATENT DOCUMENTS

| | | |
|---|---|---|
| JP | 2016-037127 A | 3/2016 |
| JP | 2016-037128 A | 3/2016 |
| WO | 2015/162943 A1 | 10/2015 |

\* cited by examiner

FRONT PASSENGER SEAT AIRBAG DEVICE

CROSS-REFERENCE TO RELATED APPLICATION

This application is based on and claims priority under 35 USC 119 from Japanese Patent Application No. 2016-154061 filed on Aug. 4, 2016, the disclosure of which is incorporated by reference herein.

BACKGROUND

Technical Field

The present disclosure relates to a front passenger seat airbag device.

Related Art

Front passenger seat airbags are conventionally known that include a first airbag section inflated and deployed at the vehicle front side of an occupant seated in a front passenger seat, and a second airbag section positioned at the vehicle width direction inner side of the first airbag section and bulging out further toward the vehicle rear side than a rear end of the first airbag section (see, for example, Japanese Patent Application Laid-Open (JP-A) Nos. 2016-037127 and 2015-231808). Since a front passenger seat airbag with the above structure has left-right asymmetry in a vehicle plan view, it may be referred to as a "front passenger seat airbag having a left-right asymmetrical structure" in the explanation below. Furthermore, in the explanation below, an occupant seated in the front passenger seat is referred to as a "front passenger seat occupant" and an occupant seated in the driving seat is referred to as a "driving seat occupant".

In a front passenger seat airbag device described in JP-A No. 2016-037127, a spacer or the like with a height equivalent to a difference in respective folded heights is set on the first airbag section side of a back face of an airbag door, due to the folded height of the first airbag section being lower than the folded height of the second airbag section. Thus, deployment load from the first airbag section and deployment load from the second airbag section received by the back face of the airbag door are made substantially uniform and the airbag door is opened out without any bias toward the left or right, enabling the deployment behavior of the front passenger seat airbag having a left-right asymmetrical structure to be stabilized.

However, in the case of the front passenger seat airbag device described in the above documents, configuration is such that the spacer or the like is set on the first airbag section side of the back face of the airbag door, such that the first airbag section forcefully strikes the spacer when the front passenger seat airbag is inflated and deployed. It is therefore conceivable that the spacer or the like might fall off the back face of the airbag door.

In a front passenger seat airbag device described in JP-A No. 2015-231808 also, a folded height ("folded height H2") of the second airbag section is slightly higher than a folded height ("folded height H1") of the first airbag section. When a first inflator and a second inflator with different heights to each other in a first modified example illustrated in FIG. 5B are applied to the front passenger seat airbag illustrated in FIG. 1 of JP-A No. 2015-231808, an upper face of the higher-height first inflator elevates the first airbag section that has a relatively low folded height. This enables a similar effect to that of the spacer of the front passenger seat airbag device described in JP-A No. 2016-037127 to be expected.

However, a different issue arises in the case of the front passenger seat airbag device described in JP-A No. 2015-231808. Namely, in this front passenger seat airbag device, a folded width ("folded length L2") of the second airbag section in a folded state is set longer than a folded width ("folded length L1") of the first airbag section in a vehicle plan view. The purpose of this is to utilize initial inflation of a base portion positioned between the first airbag section and the second airbag section to inflate and deploy the second airbag section prior to the first airbag section. Thus, supposing that the first inflator and the second inflator with different heights to each other illustrated in FIG. 5B were applied to the front passenger seat airbag illustrated in FIG. 1A of JP-A No. 2015-231808, despite being able to eliminate the possibility that a spacer may fall off or the like, this would not change the fact that the second airbag section with the longer folded length opens out the airbag door prior to the first airbag section with the shorter folded length. Thus, in the case of this front passenger seat airbag device, a substantially uniform deployment load cannot be made to act on the back face of the airbag door and the airbag door cannot be made to open out substantially uniformly on both left and right sides.

Thus, in the technology of the documents described above, it is difficult to both prevent a spacer from falling off or the like during inflation and deployment of the first airbag section, and to open out an airbag door substantially uniformly so as to stabilize the deployment behavior of the front passenger seat airbag having a left-right asymmetrical structure, and there is room for improvement of the technology described in the above documents regarding these points.

SUMMARY

In consideration of the above circumstances, the present disclosure provides a front passenger seat airbag device, having a configuration in which a front passenger seat airbag in which a folded height of a first airbag section is lower than a folded height of a second airbag section, capable of stabilizing deployment behavior during inflation and deployment of the front passenger seat airbag, without providing a spacer or its equivalent to an airbag door.

A front passenger seat airbag device of a first aspect of the present disclosure includes: a module case configured to be disposed on a back side of an airbag door provided on a front passenger seat side of an instrument panel; a front passenger seat airbag configured such that, in a state folded into a rectangular shape as viewed from the airbag door side and stowed inside the module case, a folded height of a first airbag section positioned at a vehicle width direction outer side is lower than a folded height of a second airbag section positioned at a vehicle width direction inner side of the first airbag section, and a folded width of the first airbag section and a folded width of the second airbag section along the vehicle width direction as viewed from the airbag door side are substantially the same; an inflator that is disposed at a bottom portion side of the module case and that on actuation supplies gas into the front passenger seat airbag; and a raising member that is disposed further toward a bottom portion of the module case than the front passenger seat airbag, and that is configured to raise a height of a first support face supporting a lower face of the first airbag section to be higher than a height of a second support face supporting a lower face of the second airbag section, such that a height of an upper face of the first airbag section in a folded state is substantially aligned with a height of an upper face of the second airbag section in a folded state.

In the present aspect, the airbag door is provided on the front passenger seat side of the instrument panel, and the module case is disposed on the back face side of the airbag door. The front passenger seat airbag including the first airbag section and the second airbag section is stowed in a folded state inside the module case.

During a head-on collision, the inflator disposed on the bottom side of the module case is actuated and generates gas. The generated gas is supplied into the front passenger seat airbag. The front passenger seat airbag is thereby inflated and deployed toward the front passenger seat occupant. Namely, the first airbag section is inflated and deployed at the vehicle width direction outer side, and the second airbag section is inflated and deployed at the vehicle width direction inner side of the first airbag section and toward the vehicle rear side. Namely, the front passenger seat airbag is inflated and deployed in a left-right asymmetrical shape in vehicle plan view.

Note that the front passenger seat airbag is folded into a rectangular shape as viewed from the airbag door side, and the folded width of the first airbag section and the folded width of the second airbag section along the vehicle width direction are substantially the same. Moreover, the folded height of the first airbag section is lower than the folded height of the second airbag section.

However, in the present aspect, the height of the first support face supporting the lower face of the first airbag section is made higher than the height of the second support face supporting the lower face of the second airbag section by the raising member, such that the height of the upper face of the first airbag section in the folded state is substantially aligned with the height of the upper face of the second airbag section in the folded state. Thus, the deployment load at which the upper face of the first airbag section presses the back face of the airbag door and the deployment load at which the upper face of the second airbag section presses the back face of the airbag door when the front passenger seat airbag is inflated and deployed are substantially equal. The airbag door is thereby opened out on the first airbag section side and the second airbag section side at substantially the same timing, and the deployment behavior of the front passenger seat airbag is stabilized.

Note that "rectangular shape" referred to herein also includes shapes that are close to being rectangular shaped, in addition to perfect rectangular shapes. Moreover, "a folded width of the first airbag section and a folded width of the second airbag section along the vehicle width direction are substantially the same" includes cases in which both widths are nearly the same despite not being exactly the same, in addition to cases in which both widths are exactly the same. The "folded height of the first airbag section" does not refer to the height from a fixed position of the front passenger seat airbag to the module case, but instead refers to the height of a portion where the first airbag section is folded and piled on itself. Similarly, the "folded height of the second airbag section" does not refer to the height from a fixed position of the front passenger seat airbag to the module case, but instead refers to the height of a portion where the second airbag section is folded and piled on itself. Moreover, "such that a height of an upper face of the first airbag section in a folded state is substantially aligned with a height of an upper face of the second airbag section in a folded state" refers to cases in which the height of the upper face of the first airbag section in the folded state substantially matches the height of the upper face of the second airbag section in the folded state substantially. Thus, the height of the upper face of the first airbag section in the folded state does not need to perfectly match the height of the upper face of the second airbag section in the folded state. Moreover, "raising member" incorporates both configurations in which the inflator doubles as the raising member, and configurations in which the raising member is provided separately to the inflator.

In a configuration has been employed in which a spacer or its equivalent is provided as a raising member at a back face of an airbag door, it would be conceivable that a first airbag section might catch on the spacer or its equivalent in the inflation and deployment process of a front passenger seat airbag, such that an excessive deployment load would act on the spacer or its equivalent. In contrast thereto, in the present aspect, the raising member is disposed further toward the bottom wall of the module case than the front passenger seat airbag, such that the raising member does not catch on the first airbag section during the inflation and deployment process of the front passenger seat airbag.

Thus, the front passenger seat airbag device according to the present aspect enables the deployment behavior during inflation and deployment of the front passenger seat airbag to be stabilized without providing a spacer or its equivalent to the airbag door in a configuration including the front passenger seat airbag in which the folded height of the first airbag section is lower than the folded height of the second airbag section.

The present aspect may be configured such that the inflator is only disposed at a first airbag section side, and the inflator doubles as the raising member and an upper face of the inflator configures the first support face.

In the present configuration, the inflator is only disposed on the first airbag section side, and the upper face of the inflator configures the first support face that supports the lower face of the first airbag section. Namely, the inflator doubles as the raising member. Thus, there is no consequent increase in the number of components, and a dead space arising due to the difference between the folded heights of the first airbag section and the second airbag section may be effectively utilized. In particular, since the inflator is not provided on the second airbag section side, a larger height difference between the first airbag section and the second airbag section may be filled by the inflator.

The present configuration thereby reduces costs, and also attains a more compact device while allowing the front passenger seat airbag in which the first airbag section and the second airbag section have different folded heights to be stowed, therefore increasing the ease of installation in a vehicle.

The present aspect may be configured further including a first flow-regulating member including: a first flow-regulating portion that covers a gas ejection section of the inflator, that is disposed on the first airbag section side, and that is formed with a first flow-regulating hole; a second flow-regulating portion that is disposed on the second airbag section side and that is formed with a second flow-regulating hole; and a first step portion that links the first flow-regulating portion and the second flow-regulating portion together such that a height of an upper face of the first flow-regulating portion is higher than a height of an upper face of the second flow-regulating portion. A total opening area of the second flow-regulating hole is set larger than a total opening area of the first flow-regulating hole, the first flow-regulating member configures the raising member, the upper face of the first flow-regulating portion configures the first support face, and the upper face of the second flow-regulating portion configures the second support face.

In the present configuration, the first flow-regulating portion of the first flow-regulating member is disposed on the first airbag section side, and the second flow-regulating portion of the first flow-regulating member is disposed on the second airbag section side. The first flow-regulating portion covers the gas ejection section of the inflator, and so some of the gas is supplied into the first airbag section though the first flow-regulating hole when gas is ejected from the gas ejection section of the inflator. The remaining gas is supplied into the second airbag section through the second flow-regulating hole. The front passenger seat airbag is inflated and deployed accordingly.

In the present configuration, the total opening area of the second flow-regulating hole is set larger than the total opening area of the first flow-regulating hole, and so gas ejected from the inflator is distributed in good balance according to the height difference in the respective folded heights of the first airbag section and the second airbag section. Furthermore, the height of the first support face with respect to the second support face may be easily changed by changing the shape of the first flow-regulating member (i.e., the height of the first step portion).

Thus, the present configuration enables suitable amounts of gas generated by the inflator to be respectively supplied to the first airbag section and the second airbag section, and enables the height of the first support face with respect to the second support face to be easily adjusted.

The present aspect may be configured such that: the inflator is configured by a first inflator configured by a circular disk-type inflator and disposed on the first airbag section side, and a second inflator configured by a circular disk-type inflator and disposed on the second airbag section side; a height of an upper face of a main body of the first inflator is set higher than a height of an upper face of a main body of the second inflator, and the first inflator doubles as the raising member; and an upper face of the first inflator configures the first support face and an upper face of the second inflator configures the second support face.

In the present configuration, gas generated by the first inflator is supplied into the first airbag section, and gas generated by the second inflator is supplied into the second airbag section.

Note that in the present configuration, the first inflator is disposed on the first airbag section side, and the second inflator is disposed on the second airbag section side. Thus, when output from the first inflator alone is insufficient, this shortage may be made up by the second inflator.

Moreover, the first inflator and the second inflator are both circular disk-type inflators, and the height of the upper face of the main body of the first inflator is set higher than the height of the upper face of the main body of the second inflator. The upper face of the first inflator configures the first support face, and the upper face of the second inflator configures the second support face. This enables the first inflator to be made to function as the raising member. Note that "a height of an upper face of a main body of the first inflator" refers herein to the height from an upper face of the bottom portion (i.e., the bottom face) of the module case to the upper face of the main body of the first inflator. Similarly "a height of an upper face of a main body of the second inflator" refers to the height from the upper face of the bottom portion (i.e., the bottom face) of the module case to the upper face of the main body of the second inflator.

The upper face of the main body of the first inflator configuring the first support face and the upper face of the main body of the second inflator configuring the second support face are both configured by circular shaped planar faces without any unevenness, or by circular shaped, substantially planar faces without a large dip, even if there is some unevenness. Thus, deployment load acting on the back face of the airbag door from the first airbag section that inflates and deploys on bearing reaction force from the first support face, and deployment load acting on the back face of the airbag door from the second airbag section that inflates and deploys on bearing reaction force from the second support face, are substantially uniform.

Thus, the present configuration enables cases in which the front passenger seat airbag has a large volume to be handled, and enables the deployment performance of the airbag door to be further improved, therefore enabling the deployment behavior of the front passenger seat airbag to be further stabilized.

The present aspect may be configured such that an overall height of the main body of the first inflator is set higher than an overall height of the main body of the second inflator.

In the present configuration, the overall height of the main body of the first inflator is set higher than the overall height of the main body of the second inflator. Namely, in the present configuration, two types of circular disk-type inflators, each with a different main body height, are employed. Note that "an overall height of the main body of the inflator" refers herein to an axial direction length from the lower face to the upper face of the main body of the disk-type inflator. This enables the first inflator, with the high-height main body that enables output to be relatively increased, to be disposed on the first airbag section side, where the dead space corresponding to the difference between the folded height of the first airbag section and the folded height of the second airbag section is present.

The present configuration accordingly enables both deployment reliability in terms of enabling fast deployment of the front passenger seat airbag, and increased ease of installation in a vehicle due to a more compact device, to be attained.

The present aspect may be configured such that an overall height of a main body of the first inflator and an overall height of a main body of the second inflator are substantially the same; the first inflator includes a first flange provided on an outer peripheral portion of the main body of the first inflator, that extends out toward a radial direction outside from the main body, and that is fixed to the bottom portion of the module case; the second inflator includes a second flange provided on an outer peripheral portion of the main body of the second inflator, that extends out toward a radial direction outside from the main body, and that is fixed to the bottom portion of the module case; and a height on the main body of the first inflator of the first flange is set lower than a height on the main body of the second inflator of a second flange.

In the present configuration, the overall height of the main body of the first inflator and the overall height of the main body of the second inflator are substantially the same. Namely, in the present configuration, circular disk-type inflators with substantially the same main body height are employed. However, the heights where the flanges are provided to the first inflator and the second inflator are different from each other. Specifically, the height where the first flange is provided to the first inflator is set lower than the height where the second flange is provided to the second inflator. Note that "the height where the flange is provided to the inflator" refers herein to an axial direction length from the lower face of the main body of the inflator to the lower face of the flange. Thus, the height from an upper face of the first flange to an upper face of the main body of the first inflator is higher than the height from an upper face of the second flange to an upper face of the main body of the second inflator. Therefore, the first inflator may be made to function as the raising member by disposing the first inflator on the first airbag section side, where the dead space corresponding to the difference between the folded height of the first airbag section and the folded height of the second airbag section is present. The first inflator and the second inflator may be obtained simply by changing the heights where the flanges are provided in this manner, thereby enabling a disk-type inflator employed in a driving seat airbag device to be utilized. Namely, if employing a disk-type inflator employed in a driving seat airbag device as the second inflator, for example, it is sufficient to simply prepare the first inflator in which the height at which the flange is provided has been changed.

Thus, the present configuration enables common components to be employed and therefore a reduction in cost to be achieved by utilizing a disk-type inflator employed in a driving seat airbag device.

The present aspect may be configured such that: the inflator includes a first inflator configured by a circular disk-type inflator and disposed on the first airbag section side, and a second inflator configured by a circular disk-type inflator and disposed on the second airbag section side; the bottom portion of the module case includes a first bottom portion to which the first inflator is fixed, a second bottom portion to which the second inflator is fixed, and a second step portion that links the first bottom portion and the second bottom portion together such that a height of the first bottom portion is higher than a height of the second bottom portion; and the module case doubles as the raising member.

In the present configuration, the height of the first bottom portion is made higher than the height of the second bottom portion by providing the second step portion rather than having a flat-shaped bottom portion of the module case. The first inflator is fixed to the first bottom portion, and the second inflator is fixed to the second bottom portion. Thus, the present configuration enables the module case to be made to function as the raising member, simply by changing the shape of the bottom portion of the module case.

The present configuration may accordingly be adapted to various vehicle types by changing the height of the second step portion, without changing the specifications of the first inflator and the second inflator.

The present aspect may further include a second flow-regulating member that configures the raising member, wherein the inflator may include a first inflator configured by a circular disk-type inflator and disposed at a first airbag section side, and a second inflator configured by a circular disk-type inflator and disposed at a second airbag section side; the second flow-regulating member may be only disposed on the first inflator side and may include a third flow-regulating portion covering a gas ejection section of the first inflator and formed with a third flow-regulating hole; and an upper face of the third flow-regulating portion may configure the first support face, and an upper face of the second inflator may configure the second support face.

In the present configuration, the first inflator is disposed on the first airbag section side, and the second inflator is disposed on the second airbag section side. Moreover, in the present configuration, the second flow-regulating member is only disposed on the first inflator side so as to cover the gas ejection section of the first inflator. The third flow-regulating hole is formed in the third flow-regulating portion of the second flow-regulating member, the upper face of the third flow-regulating portion formed with the third flow-regulating hole configures the first support face facing the lower face of the first airbag section, and the upper face of the second inflator configures the second support face. The second flow-regulating member accordingly functions as the raising member.

Thus, the present configuration enables the raising member to be set on the first airbag section side simply by adding the second flow-regulating member. Having the second flow-regulating member function as the raising member enables a normal disk-type inflator, such as that employed in a driving seat airbag device, to be utilized for the first inflator and the second inflator.

Moreover, high temperature gas ejected from the first inflator is momentarily trapped by the third flow-regulating portion, such that the amount of high temperature gas directly received by the first airbag section is reduced.

Thus, the present configuration enables the inflator specifications to be reduced and a corresponding reduction in cost to be achieved by employing inflators common to those employed in a driving seat airbag device, and also enables damage to the first airbag section due to the heat of the gas to be reduced.

The present aspect may further include a third flow-regulating member that configures the raising member, wherein the inflator may include a first inflator configured by a circular disk-type inflator and disposed at a first airbag section side, and a second inflator configured by a circular disk-type inflator and disposed at a second airbag section side; the third flow-regulating member may include a fourth flow-regulating portion covering a gas ejection section of the first inflator, disposed on the first airbag section side, and formed with a fourth flow-regulating hole, a fifth flow-regulating portion covering a gas ejection section of the second inflator, disposed on the second airbag section side, and formed with a fifth flow-regulating hole, and a linking portion linking the fourth flow-regulating portion and the fifth flow-regulating portion together, with a height of an upper face of the fourth flow-regulating portion set higher than a height of an upper face of the fifth flow-regulating portion; and the upper face of fourth flow-regulating portion may configure the first support face, and the upper face of the fifth flow-regulating portion may configure the second support face.

In the present configuration, the first inflator is disposed on the first airbag section side, and the second inflator is disposed on the second airbag section side. The present configuration also includes the third flow-regulating member including the fourth flow-regulating portion, the fifth flow-regulating portion, and the linking portion. The fourth flow-regulating portion is disposed between the first inflator and the first airbag section, and gas generated by the first inflator is supplied into the first airbag section through the fourth flow-regulating hole. Similarly, the fifth flow-regulating portion is disposed between the second inflator and the second airbag section, and gas generated by the second inflator is supplied into the second airbag section through the fifth flow-regulating hole.

Thus, the present configuration enables the raising member to be set on the first airbag section side simply by adding the third flow-regulating member, similarly to in the previously-described configuration. Having the third flow-regulating member function as the raising member enables a normal disk-type inflator, such as that employed in a driving seat airbag device, to be utilized for the first inflator and the second inflator.

Moreover, high temperature gas ejected from the first inflator is momentarily trapped by the third flow-regulating portion, such that the amount of the high temperature gas directly received by the first airbag section is reduced.

Similarly, high temperature gas ejected from the second inflator is momentarily trapped by the fourth flow-regulating portion, such that the amount of the high temperature gas directly received by the second airbag section is reduced.

Thus, in addition to the effects of the previously-described configuration, the present configuration enables damage not only to the first airbag section, but also to the second airbag section, due to the heat of the gas to be reduced.

The present aspect may further include a fourth flow-regulating member that configures the raising member, wherein the inflator may be configured by a circular tube shaped cylinder-type inflator disposed so as to have an axial direction along the vehicle width direction; the fourth flow-regulating member may be disposed between the cylinder-type inflator and both the first airbag section and the second airbag section, may cover a gas ejection section of the cylinder-type inflator, and may include a sixth flow-regulating portion facing the lower face of the first airbag section and formed with a sixth flow-regulating hole, a seventh flow-regulating portion facing the lower face of the second airbag section and formed with a seventh flow-regulating hole, and a third step portion linking the sixth flow-regulating portion and the seventh flow-regulating portion together such that a height of an upper face of the sixth flow-regulating portion is higher than a height of an upper face of the seventh flow-regulating portion; a total opening area of the seventh flow-regulating hole may be set larger than a total opening area of the sixth flow-regulating hole, and the upper face of the sixth flow-regulating portion may configure the first support face, and the upper face of the seventh flow-regulating portion may configure the second support face.

In the present configuration, a circular tube shaped cylinder-type inflator disposed such that its axial direction is along the vehicle width direction is employed as the inflator. The fourth flow-regulating member that covers the gas ejection section of the cylinder-type inflator is installed between the cylinder-type inflator and both the first airbag section and the second airbag section. The fourth flow-regulating member includes the sixth flow-regulating portion, the seventh flow-regulating portion and the third step portion. The sixth flow-regulating portion is disposed between the inflator and the first airbag section, and gas generated by the inflator is supplied into the first airbag section through the sixth flow-regulating hole. Similarly, the seventh flow-regulating portion is disposed between the inflator and the second airbag section, and gas generated by the inflator is supplied into the second airbag section through the seventh flow-regulating hole.

Note that in the present configuration, the total opening area of the seventh flow-regulating hole is set larger than the total opening area of the sixth flow-regulating hole, such that gas generated by the cylinder-type inflator is distributed in good balance to the first airbag section and the second airbag section. Moreover, the height of the first support face with respect to the second support face may be easily changed by changing the shape of the fourth flow-regulating member (the height of the third step portion). Furthermore, damage to the first airbag section due to high temperature gas generated by the inflator being directly received by the first airbag section may be reduced. Similarly, damage to the second airbag section due to high temperature gas generated by the inflator being directly received by the second airbag section may also be reduced.

Thus, the present configuration enables suitable amounts of gas generated by the inflator to be respectively supplied to the first airbag section and the second airbag section, enables the height of the first support face with respect to the second support face to be easily adjusted, and also enables damage to the first airbag section and the second airbag section due to the heat of the gas to be reduced.

BRIEF DESCRIPTION OF THE DRAWINGS

Exemplary embodiments will be described in detail based on the following figures, wherein.

DETAILED DESCRIPTION

First Exemplary Embodiment
Overall Configuration of First Exemplary Embodiment
Explanation follows regarding a front passenger seat airbag device 10 according to the first exemplary embodiment, with reference to FIG. 1 to FIG. 5. Note that in these drawings, the arrow FR indicates the vehicle front side, the arrow UP indicates the vehicle upper side, and the arrow IN indicates the vehicle width direction inner side. The front passenger seat airbag device 10 indicated in the respective drawings is employed in a left-hand drive vehicle.

Figure 3:
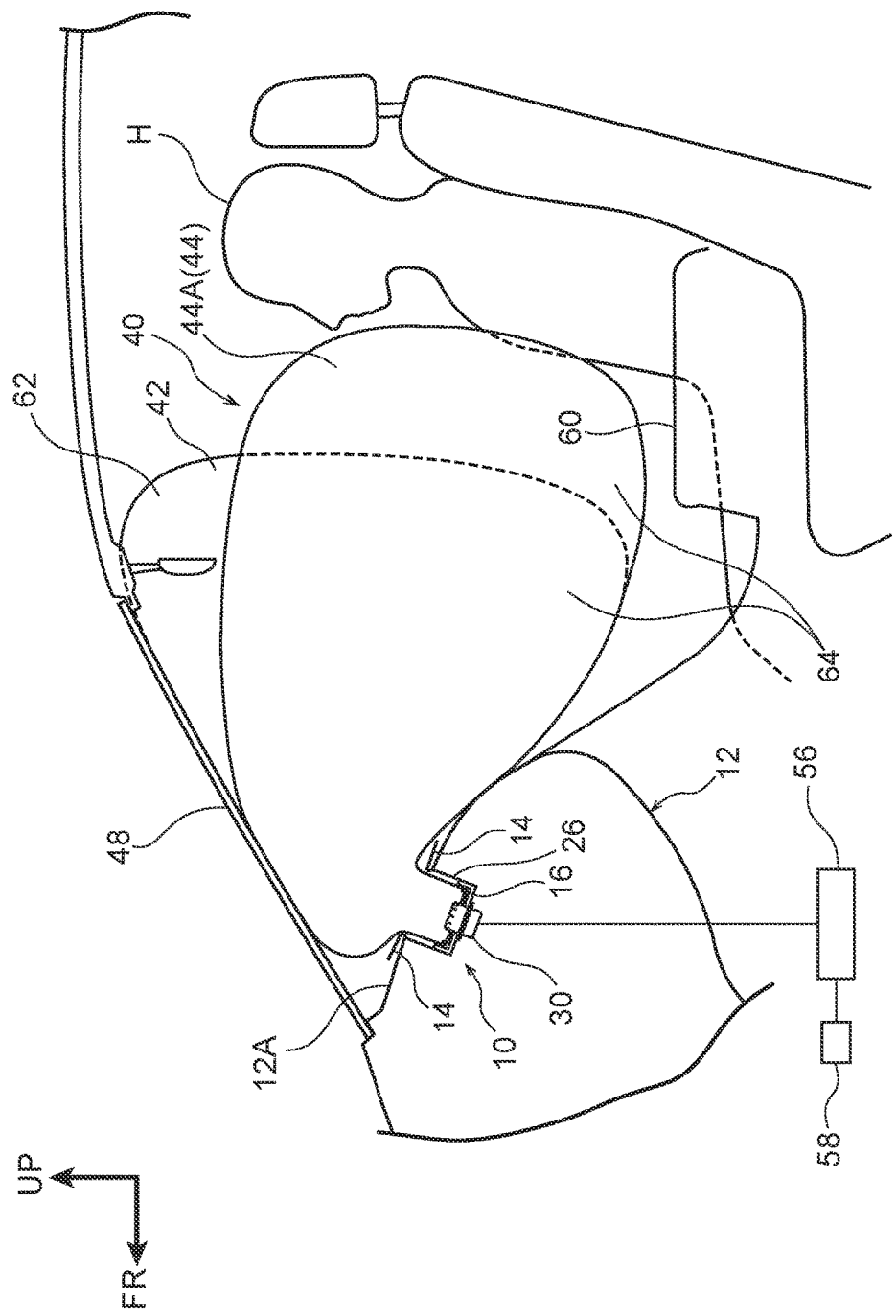
FIG. 3 is a side-on view viewed from the vehicle width direction outer side, illustrating a state in which the front passenger seat airbag device illustrated in FIG. 1 has been actuated and the front passenger seat airbag has been inflated and deployed.

As illustrated in FIG. 3, the front passenger seat airbag device 10 is installed on the vehicle lower side of an upper face portion 12A on the front passenger seat side of an instrument panel 12. The front passenger seat airbag device 10 is configured by airbag doors 14 provided on the upper face portion 12A side and an airbag module 16 disposed on a back face side (i.e., vehicle lower side) of the airbag doors 14.

Figure 1:
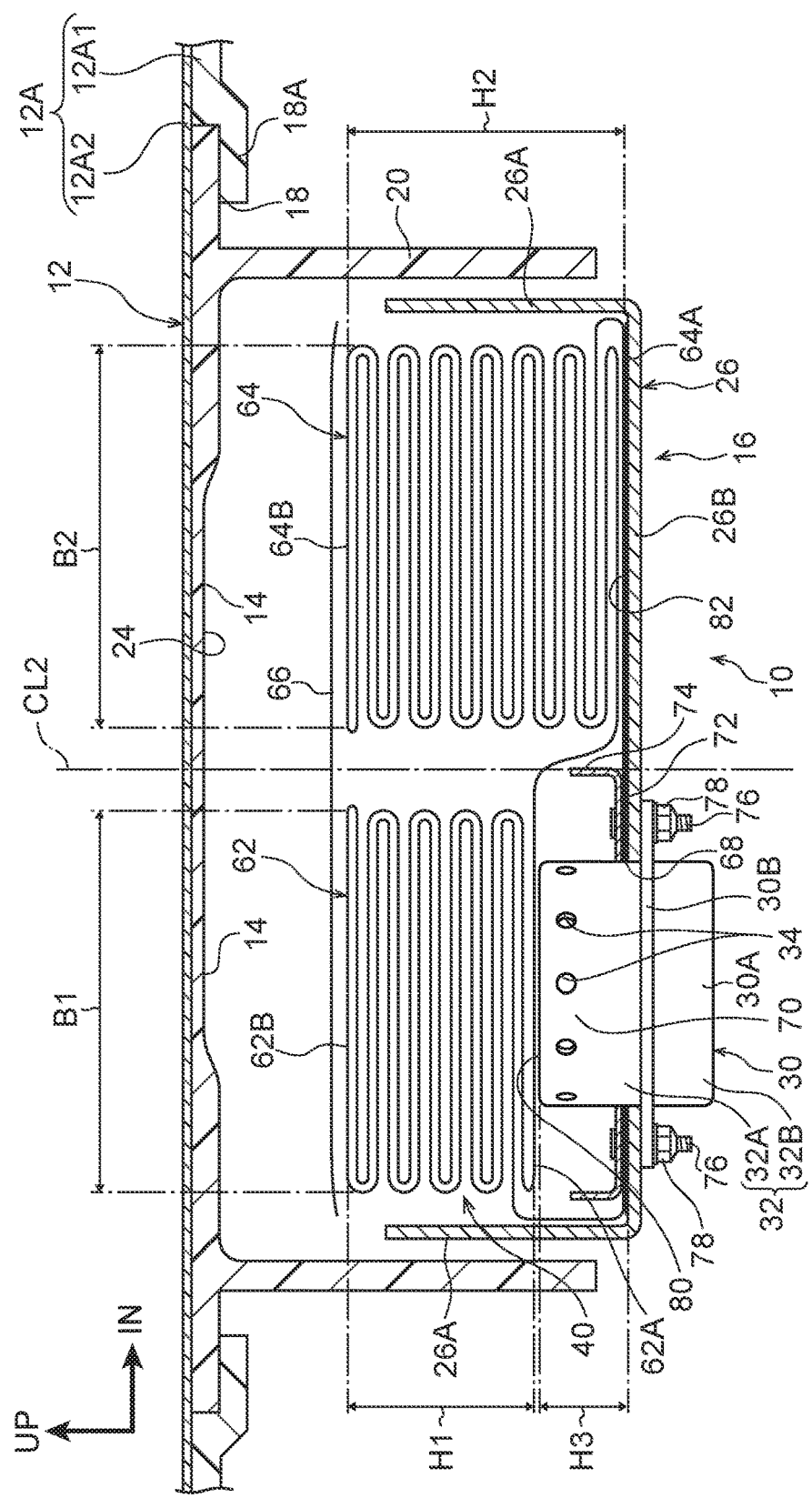
FIG. 1 is an enlarged cross-section illustrating a front passenger seat airbag device according to a first exemplary embodiment in a state sectioned in the vehicle width direction along line 1-1 in FIG. 2.

As illustrated in FIG. 1, the upper face portion 12A of the instrument panel 12 is configured by a substrate 12A1 made of resin, and a covering layer 12A2 provided on the surface of the substrate 12A1. As an example, the covering layer 12A2 has a double-layered structure configured of a cover configuring a styling face, and a foamed layer provided between a back face of the cover and the surface of the substrate 12A1. Note that the covering layer 12A2 may be configured by just a cover.

An opening 18 with a rectangular shape in vehicle plan view is formed in the substrate 12A1 of the upper face portion 12A on the front passenger seat side. A peripheral edge 18A of the opening 18 in the substrate 12A1 has a step shape that drops toward the vehicle lower side of the substrate 12A1. The airbag doors 14, which are configured using a material that does not break at extremely low temperatures, unlike the substrate 12A1, are installed so as to block the opening 18.

Figure 2:
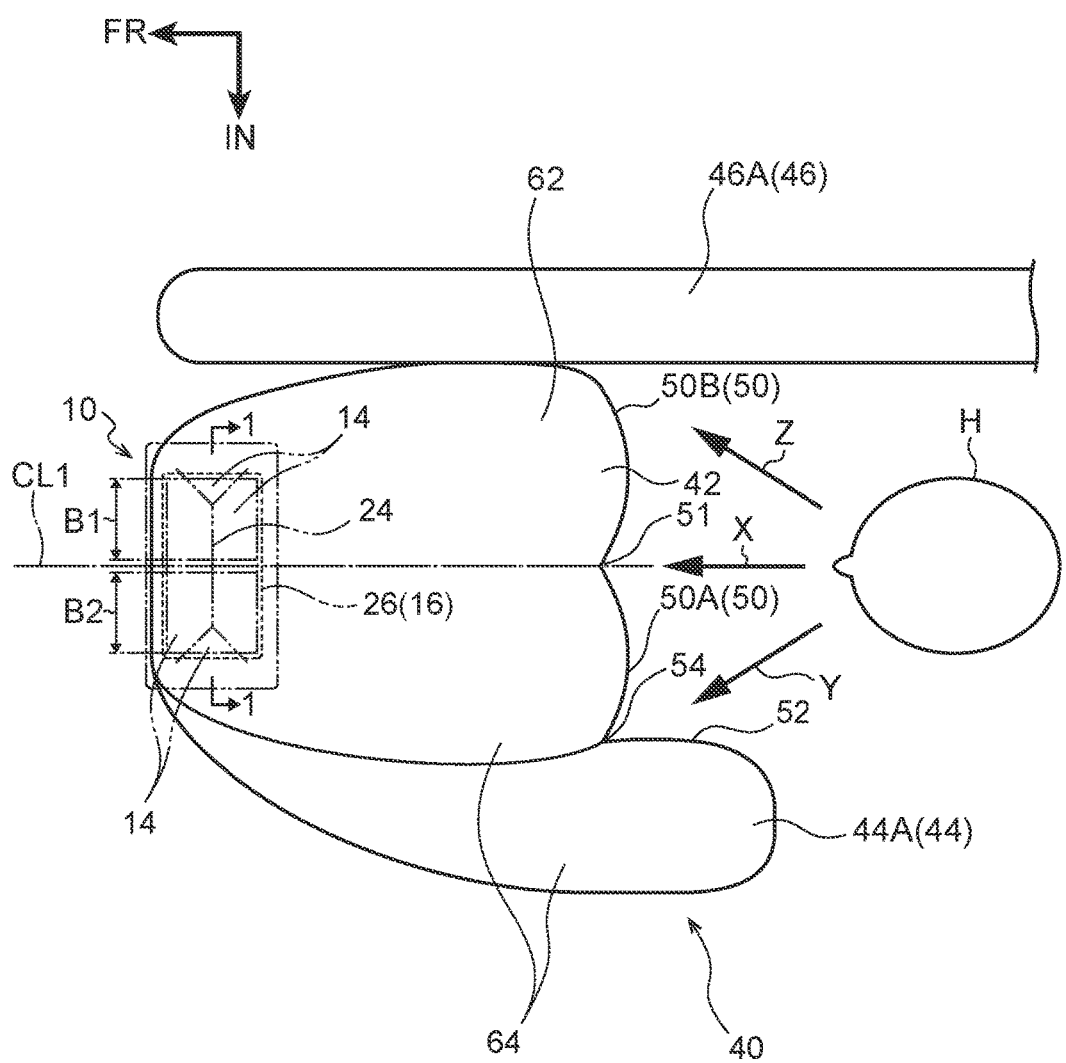
FIG. 2 is a plan view schematically illustrating a state in which the front passenger seat airbag device illustrated in FIG. 1 has been actuated and a front passenger seat airbag has been inflated and deployed.

A leg portion 20, which extends out in a substantially rectangular frame shape toward the vehicle lower front side, is integrally formed at a lower face of the airbag door 14. Plural, non-illustrated anchoring holes, each configured as a rectangular shaped through-hole, are respectively formed at specific spacings in lower portions of front and rear walls of the leg portion 20. A thinned portion (or tear line) 24, having a cross-section profile configured by an inverted V-shaped notch, is formed inside the leg portion 20, in a region enclosed by the leg portion 20, of the airbag doors 14. Viewed from the back face side of the airbag doors 14, the thinned portion 24 is formed in a substantially H shape (that is, a shape in which two "Y" shapes have been laid in opposite directions to each other and connected together as illustrated in FIG. 2). Thus, when a deployment load of a specific value or greater acts on the airbag doors 14, the airbag doors 14 rupture from the center of the thinned portion 24 so as to split open along the thinned portion 24, and open out in four directions in the vehicle front-rear direction and the vehicle width direction.

Note that the shape of the thinned portion 24 is not limited thereto. For example, a thinned portion with an H shape in vehicle plan view may be employed. In such cases, the airbag doors open out in two directions in the vehicle front-rear direction. Alternatively, a thinned portion with a U shape in vehicle plan view may be employed. In such cases, the airbag doors open out in one direction in the vehicle front-rear direction. Although the above-described airbag doors 14 is configured to be integrally formed at the instrument panel 12, there is no limitation thereto, and airbag doors configured as a separate body to the instrument panel may be employed.

Figure 4:
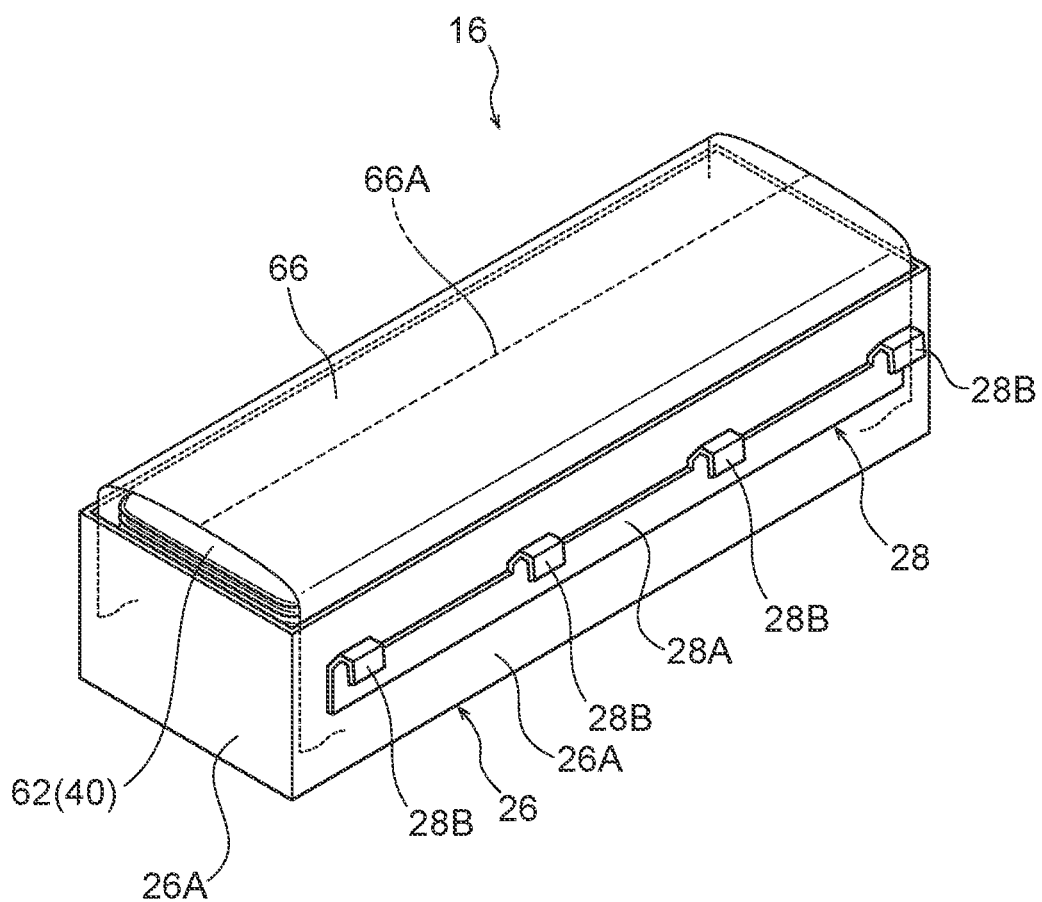
FIG. 4 is a perspective view of the airbag module illustrated in FIG. 1.

As illustrated in FIG. 4, the airbag module 16 includes a module case 26 made of metal and formed in a substantially box shape. An anchor tool 28 for anchoring the airbag doors 14 to the module case 26 is attached to an outer face of front and rear side walls 26A of the module case 26. Each anchor tool 28 is configured by a main body 28A, configured using a strip shaped metal plate that is fixed to the respective side wall 26A, and plural hooks 28B extending out from an upper edge of the main body 28A. The pitch of the plural hooks 28B matches the pitch of the plural previously-mentioned anchoring holes. Each hook 28B is formed in a vertically inverted J shape that is capable of being anchored in the corresponding anchoring hole. The hooks 28B of the module case 26 are respectively anchored in the anchoring holes of the leg portion 20 of the airbag door 14.

As illustrated in FIG. 1, an inflator 30 that, on actuation, supplies gas into a front passenger seat airbag 40, described later, is disposed in a bottom portion side of the module case 26. Note that, although FIG. 1 is an enlarged cross-section illustrating a state in which the front passenger seat airbag device 10 has been sectioned in the vehicle width direction along line 1-1 in FIG. 2, the inflator 30 is illustrated without having been sectioned. The inflator 30 is a circular disk-type inflator. Specifically, the inflator 30 is configured by a circular tube shaped main body 30A closed off at both axial direction ends, and a plate shaped flange 30B that extends out from an outer circumferential portion of the main body 30A toward the radial direction outside. As an example, an inflator case 32 configuring an outer shell of the inflator 30 is configured by joining together in the axial direction an upper case 32A made of metal and formed in a hat shape, and a semicircular tube shaped lower case 32B made of metal and closed off at one axial direction end. Plural gas ejection holes 34 are formed at specific spacings about a circumferential wall of the upper case 32A. Although the flange 30B is formed at the upper case 32A in this example, the flange 30B may be formed at the lower case 32B. A flange forming an annular shape as viewed along the axial direction of the inflator 30, a flange formed with attachments projecting out at 90 degree spacings from a flange main body formed in an annular shape, a flange formed in a rectangular shape, or the like may be employed as the flange 30B. Although a method is employed in which a gas generating agent is employed to generate gas in the inflator 30, there is no limitation thereto, and a type of inflator containing high pressure gas, or a hybrid type of inflator employing both gas generating agent and high pressure gas, may be employed.

Explanation follows regarding configuration of the front passenger seat airbag 40, with reference to FIG. 1 to FIG. 3. FIG. 2 and FIG. 3 respectively illustrate a vehicle plan view and a vehicle side-on view of the front passenger seat airbag 40 in a completely deployed state. As illustrated in FIG. 2 and FIG. 3, the front passenger seat airbag 40 is configured by a front passenger seat airbag main body 42 that is inflated and deployed toward a front passenger seat by gas supplied from the inflator 30, and a center airbag section 44 that is integrally formed at the vehicle width direction inner side of the front passenger seat airbag main body 42. In the vehicle, curtain airbag devices 46 (see FIG. 2) are respectively installed along left and right roof side rails. The respective curtain airbag device 46 is actuated during a side-on collision, a small overlap collision, an oblique collision, or in a rollover, causing a terminal portion at the vehicle width direction outer side of a roof head lining to undergo elastic deformation and a curtain airbag 46A to inflate and deploy toward the vehicle lower side.

As illustrated in FIG. 3, when the front passenger seat airbag main body 42 bulges out from the upper face portion 12A of the instrument panel 12, the front passenger seat airbag main body 42 momentarily abuts windshield glass 48 disposed obliquely facing the upper face portion 12A in the vehicle vertical direction. The front passenger seat airbag main body 42 then bears reaction force from the upper face portion 12A and the windshield glass 48, and is inflated and deployed toward the front passenger seat (vehicle rear side).

As illustrated in FIG. 2, a first head restraint face 50 for restraining the head H of a front passenger seat occupant during a full overlap head-on collision is formed at a rear end of the front passenger seat airbag main body 42 in the completely deployed state. Specifically, the first head restraint face 50 is formed in a substantially square shape as viewed from the front passenger seat side. The first head restraint face 50 is also formed in a shape with substantially left-right symmetry about a vertical line linking a center point on an upper edge and a center point on a lower edge thereof. A left side first head restraint face 50A and a right side first head restraint face 50B are each configured with a curved protruding shape that gently bulges out toward the front passenger seat. Configuration is such that the head H of the front passenger seat occupant is received by a first groove 51 that is formed at a boundary portion between the left and right first head restraint faces 50A, 50B and is indented toward the vehicle front side. The head H is wedged between the left and right first head restraint faces 50A, 50B, such that the head H is prevented from rotating about its axis, its axial direction being along the vehicle vertical direction.

As illustrated in FIG. 2 and FIG. 3, the center airbag section 44 is integrally formed at the vehicle width direction inner side of the front passenger seat airbag main body 42. The center airbag section 44 is lower in height than the front passenger seat airbag main body 42, and bulges out further toward the vehicle rear side than the rear end of the front passenger seat airbag main body 42. The portion of the center airbag section 44 that projects out further toward the vehicle rear side than the rear end of the front passenger seat airbag main body 42 is hereafter referred to as a "bulge portion 44A of the center airbag section 44". As illustrated in FIG. 3, in a completely deployed state, the center airbag section 44 bears reaction force from the upper face portion 12A of the instrument panel 12 and the windshield glass 48 and is inflated and deployed toward the vehicle rear side similarly to the front passenger seat airbag main body 42.

As illustrated in FIG. 2, a side face of the inflation portion 44A of the center airbag section 44 that faces the front passenger seat airbag main body 42 configures a second head restraint face 52. The second head restraint face 52 is a face extending along the vehicle front-rear direction and the vehicle vertical direction and is connected at a substantial right angle to the left side first head restraint face 50A so as to be continuous thereto. A second groove 54, which is notched obliquely toward the front side, this being the vehicle front and vehicle width direction inner side, is formed at the location where the left side first head restraint face 50A and the second head restraint face 52 intersect. Configuration is such that the head H of the front passenger seat occupant is received by the second groove 54 during an oblique collision or the like. The head H is wedged between the left side first head restraint face 50A and the second head restraint face 52, such that the head H is prevented from rotating about its axial direction along the vehicle vertical direction.

Note that, as is clear from the above explanation, a "completely deployed state of the front passenger seat airbag main body" refers to a state in which the first head restraint faces 50A, 50B are formed at the rear end of the front passenger seat airbag main body 42. Moreover, a "completely deployed state of the center airbag section" refers to a state in which the second head restraint face 52 is formed at the side face of the center airbag section 44 that faces the front passenger seat airbag main body 42.

Explanation follows regarding a deployment control system of the above-described front passenger seat airbag device 10. As illustrated in FIG. 3, an ignition device of the inflator 30 is electrically connected to an electronic control unit (ECU) 56, this being a controller. The ECU 56 is also electrically connected to collision detection sensors 58.

As an example, acceleration sensors may be employed as the collision detection sensors 58. Employing plural acceleration sensors enables not only the fact that a collision has occurred, but also the mode of the collision and so on to be detected. For example, a method may be employed in which non-illustrated front satellite sensors are respectively installed in the vicinity of front ends of a left and right pair of front side members installed on both vehicle width direction sides of a vehicle front section, and a non-illustrated floor sensor is installed on the floor below a center console 60.

If acceleration that is substantially uniform and exceeds a specific threshold value is detected by both the left and right satellite sensors, determination may be made that a full overlap head-on collision of the vehicle has occurred. If a large rate of acceleration of a specific threshold value or greater has been detected by either the left or right satellite sensor alone, determination may be made that an offset collision of the vehicle has occurred. If plural reference threshold values are pre-set, and acceleration exceeding the highest threshold value has been detected by either the left or right satellite sensor alone, determination may be made that a small overlap collision has occurred at the side detected by the respective satellite sensor. Determination may also be made as to whether or not an oblique collision has occurred from the acceleration waveforms respectively detected by the left and right satellite sensors and the floor sensor. In the example explained above, a collision determination system employs acceleration sensors; however, there is no limitation thereto, and collision modes may be determined by another method (such as a method employing an onboard camera in addition to acceleration sensors).

As a supplementary explanation of the collision modes, an "oblique collision" is defined as a collision from the oblique front (as an example, a collision at a relative angle of 15° and with a vehicle width direction overlap amount of approximately 35% with respect to a collision partner), as stipulated by the US National Highway Traffic Safety Administration (NHTSA), for example. In the present exemplary embodiment, as an example, an oblique collision at a relative speed of 90 km/h is envisaged. A small overlap collision is an automobile head-on collision in which a vehicle width direction overlap amount with a collision partner is 25% or lower, as defined by the US Insurance Institute for Highway Safety (IIHS), for example. For example, an offset head-on collision at the vehicle width direction outer side of a front side member, this being a vehicle body frame, corresponds to a small overlap collision. In the present exemplary embodiment, as an example, a small overlap collision at a relative speed of 64 km/h is envisaged. A "full overlap head-on collision" is defined as a collision in which a test vehicle is made to collide head-on with an obstacle (barrier) made of concrete at a speed of 55 km/h.

Configuration of Relevant Portions of First Exemplary Embodiment

As illustrated in FIG. 1, FIG. 2, and FIG. 4, the above-described front passenger seat airbag 40 is folded into a rectangular shape as viewed from the airbag door side, and is stowed in the module case 26. As illustrated in FIG. 2, a section of the front passenger seat airbag 40 positioned on the vehicle width direction outer side of a center line CL1 (that is, a line extending along the vehicle front-rear direction and passing through a vehicle width direction intermediate point of the module case 26 in a vehicle plan view) of the airbag module 16 configures a first airbag section 62. A section positioned at the vehicle width direction inner side of the center line CL1 configures a second airbag section 64. The center airbag section 44 is thereby included on the second airbag section 64 side. As illustrated in FIG. 2, in the front passenger seat airbag 40 as viewed from the airbag door 14 side, a folded width B1 of the first airbag section 62 and a folded width B2 of the second airbag section 64 along the vehicle width direction are substantially the same as each other (see FIG. 1 also).

Note that "rectangular shape" referred to herein also includes shapes that are close to being rectangular shaped, in addition to perfect rectangular shapes. For example, this may include shapes in which a pair of long edges curve gently in directions moving away from each other. Moreover, "a folded width B1 of the first airbag section 62 and a folded width B2 of the second airbag section 64 along the vehicle width direction are substantially the same as each other" includes cases in which both widths B1 and B2 are almost the same despite not being exactly the same, in addition to cases in which both widths B1 and B2 are exactly the same.

As illustrated in FIG. 1, in a state in which the front passenger seat airbag 40 has been stowed in the module case 26, the first airbag section 62 is disposed on the vehicle width direction outer side of a center line CL2 (that is, a line extending along the vehicle vertical direction and passing through the vehicle width direction intermediate point of the module case 26 in vehicle face-on view) of the airbag module 16, and the second airbag section 64 is disposed on the vehicle width direction inner side of the center line CL2. In this state, a folded height H1 of the first airbag section 62 is lower than a folded height H2 of the second airbag section 64 positioned on the vehicle width direction inner side of the first airbag section 62.

Note that the "folded height H1 of the first airbag section 62" does not refer to the height from a position where the first airbag section 62 of the front passenger seat airbag 40 is fixed to a bottom wall 26B of the module case 26 by an airbag retainer 74, described later, but instead refers to the height of a portion where the first airbag section 62 is folded and piled on itself, and specifically refers to a height from a lower face 62A to an upper face 62B of the folded first airbag section 62. Similarly, the "folded height H2 of the second airbag section 64" does not refer to the height from a fixed position of the front passenger seat airbag 40 to the module case 26, but rather refers to the height of a portion where the second airbag section 64 is folded and piled on itself, and specifically refers to a height from a lower face 64A to an upper face 64B of the folded second airbag section 64. Note that in the case of the present exemplary embodiment, the lower face 64A of the second airbag section 64 is directly mounted to the bottom wall 26B of the module case 26, and so the folded height H2 is effectively the same as the height from the fixed position of the front passenger seat airbag 40 to the module case 26.

As illustrated in FIG. 1 and FIG. 4, in a folded state, the above-described front passenger seat airbag 40 is covered by a roll shaped protective cloth (packaging cloth) 66. One end of the protective cloth 66 is fixed by stitching to the front passenger seat airbag 40. Non-illustrated insertion holes are formed in another end of the protective cloth 66 in order to insert stud bolts 76, described later. The front passenger seat airbag 40 is retained in the folded state by the protective cloth 66. A tear portion 66A is formed in a straight line running along the vehicle width direction in a location of the protective cloth 66 facing the airbag door 14. The protective cloth 66 tears easily along the tear portion 66A when deployment load is applied to the protective cloth 66.

In the present exemplary embodiment, the inflator 30 is only disposed on the first airbag section 62 side. In other words, the inflator 30 is disposed offset to the first airbag section 62 side of the bottom wall 26B of the module case 26. Specifically, a circular shaped inflator attachment hole 68 is only formed in the bottom wall 26B of the module case 26 in a position facing the first airbag section 62 in the vehicle vertical direction. An internal diameter of the inflator attachment hole 68 is set slightly larger than an external profile of the main body 30A of the inflator 30. The inflator 30 is inserted into the inflator attachment hole 68 from the vehicle lower side of the bottom wall 26B of the module case 26 (from the outside of the module case 26). In the present exemplary embodiment, a configuration is employed in which the inflator 30 is inserted from the outside of the bottom wall 26B of the module case 26; however, there is no limitation thereto, and a configuration may be employed in which an inflator is inserted from the inside of a module case.

In a state in which the flange 30B of the inflator 30 has abutted a lower face of the bottom wall 26B of the module case 26, a gas ejection section 70 (this being the section including at least the part where the gas ejection holes 34 are formed, and refers in this case to the section of the upper case 32A that is further upward than an upper face of the flange 30B of the inflator 30) of the inflator 30 is inserted in the above-described inflator attachment hole 68. The airbag retainer 74, which is made of metal and formed in a substantially ring shape, is disposed around a circumferential edge of the inflator attachment hole 68 inside the first airbag section 62. The stud bolts 76 project out from the airbag retainer 74 at specific spacings about the circumferential direction. The stud bolts 76 are pierced through a circumferential edge of an inflator insertion section 72 of the first airbag section 62 and the previously-described protective cloth 66, then inserted through non-illustrated bolt insertion holes formed in the bottom wall 26B of the module case 26. The stud bolts 76 are then inserted through non-illustrated bolt insertion holes formed in the flange 30B of the inflator 30, after which nuts 78 are screwed onto the stud bolts 76 from the lower side of the flange 30B. The front passenger seat airbag 40 and the inflator 30 are thereby fixed to the bottom wall 26B of the module case 26 in a state in which the circumferential edge of the inflator insertion section 72 of the first airbag section 62 is sandwiched between the airbag retainer 74 and the bottom wall 26B of the module case 26.

In the state in which the inflator 30 has been fixed to the bottom wall 26B of the module case 26, the lower face 62A of the first airbag section 62 is supported by an upper face (a first support face 80) of the main body 30A of the inflator 30. The lower face 64A of the second airbag section 64 is supported by an upper face (a second support face 82) of the bottom wall 26B of the module case 26. Namely, the lower face 62A of the first airbag section 62 is raised to a height H3 by the upper face (first support face 80) of the main body 30A of the inflator 30. Specifically, the height H3 is the height of a portion of the main body 30A of the inflator 30 that projects out from the upper face (second support face 82) of the bottom wall 26B of the module case 26 toward the airbag door 14. In relation to the previously-described inflator case 32, the height H3 refers to the overall height of the upper case 32A minus the plate thickness of the flange 30B and the plate thickness of the bottom wall 26B of the module case 26.

The above-described height H3 also corresponds to a difference in height between the folded height H1 of the first airbag section 62 and the folded height H2 of the second airbag section 64. The front passenger seat airbag device 10 is accordingly configured such that the height of the upper face 62B of the first airbag section 62 in the folded state is substantially aligned with the height of the upper face 64B of the second airbag section 64 in the folded state. Namely, in the front passenger seat airbag device 10, the inflator 30 is designed such that the height H3 of the inflator 30 from the upper face (bottom face) of the bottom wall 26B of the module case 26 substantially matches the difference in height between the folded height H1 of the first airbag section 62 and the folded height H2 of the second airbag section 64.

Note that, "such that the height of the upper face 62B of the first airbag section 62 in the folded state is substantially aligned with the height of the upper face 64B of the second airbag section 64 in the folded state" refers to cases in which the height of the upper face 62B of the first airbag section 62 in the folded state substantially matches the height of the upper face 64B of the second airbag section 64 in the folded state. Thus, the height of the upper face 62B of the first airbag section 62 in the folded state does not need to perfectly match the height of the upper face 64B of the second airbag section 64 in the folded state, and there may be a slight step between the upper face 62B and the upper face 64B.

Thus, the above-described inflator 30 doubles as a "raising member" that makes the height of the first support face 80 supporting the lower face 62A of the first airbag section 62 higher than the height of the second support face 82 supporting the lower face 64A of the second airbag section 64, such that the height of the upper face 62B of the first airbag section 62 in the folded state is substantially aligned with the height of the upper face 64B of the second airbag section 64 in the folded state.

Operation and Effects of Present Exemplary Embodiment

Explanation follows regarding operation and effects of the present exemplary embodiment.

When the vehicle is running normally, the front passenger seat airbag device 10 is in a non-actuated state. In this state, the front passenger seat airbag 40 including the first airbag section 62 and the second airbag section 64 is stowed inside the module case 26 in a folded state.

When a head-on collision occurs in this state, the head-on collision is detected by the collision detection sensors 58 and collision detection signals are output from the collision detection sensors 58 to the ECU 56. The ECU 56 thereby causes a specific current to pass to the ignition device of the inflator 30. The inflator 30 is actuated and generates gas as a result. The generated gas is ejected through the gas ejection holes 34 and supplied into the front passenger seat airbag 40 in the folded state. The front passenger seat airbag 40 is thereby inflated and deployed toward the front passenger seat occupant. Namely, the first airbag section 62 is inflated and deployed at the vehicle width direction outer side, and the second airbag section 64 is inflated and deployed at the vehicle width direction inner side of the first airbag section 62 and toward the vehicle rear side. Thus, the front passenger seat airbag 40 is inflated and deployed in a left-right asymmetrical shape in vehicle plan view.

During a full overlap head-on collision, for example, the head H of the front passenger seat occupant moves under inertia toward the vehicle front-rear direction front side (see the arrow X in FIG. 2). The head H of the front passenger seat occupant that has moved under inertia is received by the first groove 51 of the first head restraint face 50 of the front passenger seat airbag main body 42. Thus, the head H is wedged between the left and right first head restraint faces 50A, 50B, and the head H is prevented from rotating about its axial direction along the vehicle vertical direction.

During an oblique collision or the like at the driving seat side, the head H of the front passenger seat occupant moves under inertia obliquely toward the vehicle front (see the arrow Y in FIG. 2), this being the vehicle front and vehicle width direction inner side, which is the collision direction. The head H of the front passenger seat occupant that has moved under inertia is received by the second groove 54 where the left side first head restraint face 50A and the second head restraint face 52 intersect as viewed from the front passenger seat occupant side. Thus, the head H is wedged between the left side first head restraint face 50A and the second head restraint face 52, and the head H is prevented from rotating about its axial direction along the vehicle vertical direction.

In cases of an oblique collision or the like at the front passenger seat side of the vehicle front section, the head H of the front passenger seat occupant moves under inertia obliquely toward the vehicle front and vehicle width direction outer side (see the arrow Z in FIG. 2), in contrast to an oblique collision or the like at the driving seat side of the vehicle front section. In such cases, the terminal portion at the vehicle width direction outer side of the respective roof head lining undergoes elastic deformation, and the curtain airbag 46A is inflated and deployed toward the vehicle lower side. The head H of the front passenger seat occupant is restrained by the curtain airbag 46A and the right side first head restraint face 50B of the front passenger seat airbag main body 42.

Note that the above-described front passenger seat airbag 40 is folded into a rectangular shape as viewed from the airbag door 14 side, and the folded width B1 of the first airbag section 62 and the folded width B2 of the second airbag section 64 along the vehicle width direction are substantially the same. Moreover, the folded height H1 of the first airbag section 62 is lower than the folded height H2 of the second airbag section 64.

However, in the present exemplary embodiment, the height of the first support face 80 supporting the lower face 62A of the first airbag section 62 is made higher than the height of the second support face 82 supporting the lower face 64A of the second airbag section 64 by the inflator 30 that doubles as a raising member, such that the height of the upper face 62B of the first airbag section 62 in the folded state is substantially aligned with the height of the upper face 64B of the second airbag section 64 in the folded state. Thus, the deployment load at which the upper face 62B of the first airbag section 62 presses the back face of the airbag doors 14 and the deployment load at which the upper face 64B of the second airbag section 64 presses the back face of the airbag doors 14 when the front passenger seat airbag 40 is inflated and deployed are substantially equal. The airbag doors 14 are thereby opened out at the first airbag section 62 side and the second airbag section 64 side at substantially the same timing, and the deployment behavior of the front passenger seat airbag 40 is stabilized.

If a configuration has been employed in which a spacer or its equivalent is provided as a raising member at a back face of an airbag door, it would be conceivable that a first airbag might catch on the spacer or its equivalent in the inflation and deployment process of a front passenger seat airbag, such that an excessive deployment load would act on the spacer or its equivalent. In contrast thereto, in the present exemplary embodiment, the inflator 30 serving as the raising member is disposed further toward the bottom wall 26B of the module case 26 than the front passenger seat airbag 40, such that the raising member (inflator 30) does not catch on the first airbag section 62 during the inflation and deployment process of the front passenger seat airbag 40.

As explained above, the front passenger seat airbag device 10 according to the present exemplary embodiment enables the deployment behavior during inflation and deployment of the front passenger seat airbag 40 to be stabilized without providing a spacer or its equivalent to the airbag doors 14 in a configuration including the front passenger seat airbag 40 in which the folded height H1 of the first airbag section 62 is lower than the folded height H2 of the second airbag section 64.

Moreover, the inflator 30 is only disposed on the first airbag section 62 side, and the upper face of the inflator 30 configures the first support face 80 that supports the lower face 62A of the first airbag section 62. Namely, the inflator 30 doubles as a raising member. Thus, there is no consequent increase in the number of components, and a dead space arising due to the difference between the folded heights of the first airbag section 62 and the second airbag section 64 may be effectively utilized. In particular, since the inflator 30 is not provided on the second airbag section 64 side, a larger height difference between the first airbag section 62 and the second airbag section 64 may be filled by the inflator 30. The present exemplary embodiment thereby suppresses an increase in cost, and also attains a more compact device while allowing the front passenger seat airbag 40 in which the first airbag section 62 and the second airbag section 64 have different folded heights to be stowed, therefore increasing the ease of installation in a vehicle.

In the present exemplary embodiment, a circular disk-type inflator 30 is employed; however, there is no limitation thereto, and a circular tube shaped cylinder-type inflator may be employed. For example, in the example illustrated in FIG. 5, plural (two) short cylinder-type inflators 84, each with an axial direction length of only approximately half the length of the long edges of the module case 26, are disposed alongside each other in the vehicle front-rear direction. Similarly to in the present exemplary embodiment, the inflators 84 are disposed offset to the first airbag section 62 side. Thus, the configuration illustrated in FIG. 5 obtains similar effects to those in the present exemplary embodiment.

Second Exemplary Embodiment

Figure 6:
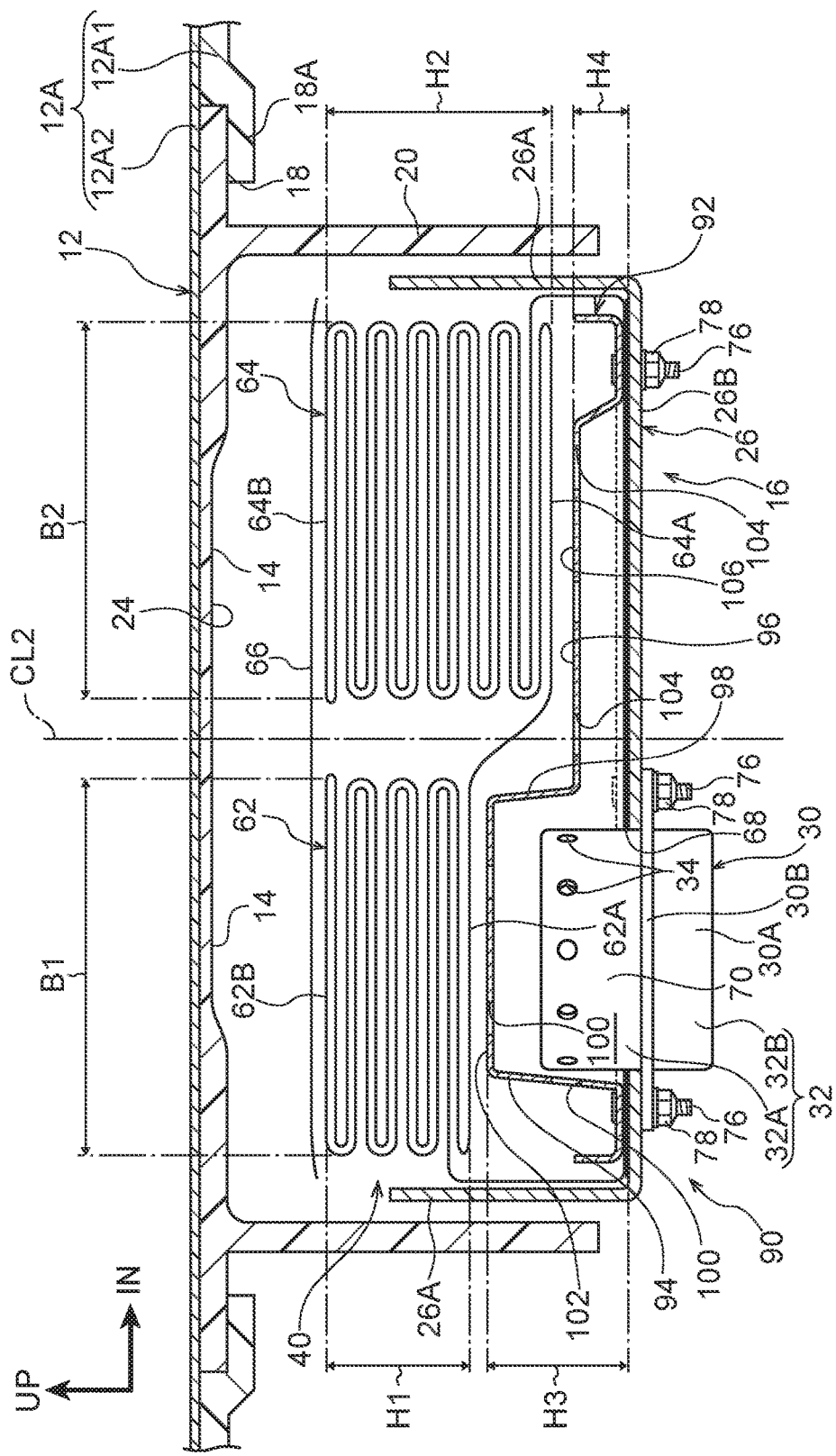
FIG. 6 is a cross-section corresponding to FIG. 1, illustrating a front passenger seat airbag device according to a second exemplary embodiment.

Explanation follows regarding a front passenger seat airbag device 90 according to the second exemplary embodiment of the present disclosure, with reference to FIG. 6. Components that are similar to as those in the previously-described first exemplary embodiment are appended with the same reference numerals, and explanation thereof is omitted.

As illustrated in FIG. 6, the feature of the front passenger seat airbag device 90 according to the second exemplary embodiment is that a diffuser 92, serving as a "first flow-regulating member" has been added to the configuration of the previously-described first exemplary embodiment.

The diffuser 92 is made of metal and installed in an inner portion of the front passenger seat airbag 40. The diffuser 92 includes a first flow-regulating portion 94 disposed on the first airbag section 62 side, a second flow-regulating portion 96 disposed on the second airbag section 64 side, and a step portion 98 serving as a "first step portion" linking the first flow-regulating portion 94 and the second flow-regulating portion 96 together. The diffuser 92 also doubles as the previously-described airbag retainer 74, and so stud bolts 76 project out at specific spacings around the peripheral direction from an outer peripheral portion of the diffuser 92.

The first flow-regulating portion 94 is formed in a cup shape so as to cover the gas ejection section 70 of the inflator 30. Plural first flow-regulating holes 100 are formed in an upper wall and a circumferential wall of the first flow-regulating portion 94. The first airbag section 62 is mounted on an upper face of the first flow-regulating portion 94. Namely, the upper face of the first flow-regulating portion 94 configures a first support face 102. Note that in FIG. 6, the lower face 62A of the first airbag section 62 is illustrated in a state floating slightly above the upper face (first support face 102) of the first flow-regulating portion 94 so as to make the positions of lines drawn from the reference numerals easier to be seen (this point similarly applies to FIG. 7 onward, which illustrate other exemplary embodiments, described later).

The second flow-regulating portion 96 is formed in a plate shape, and is disposed below the lower face 64A of the second airbag section 64. Plural second flow-regulating holes 104 are formed in an upper wall of the second flow-regulating portion 96. The second airbag section 64 is mounted to an upper face of the second flow-regulating portion 96. Namely, the upper face of the second flow-regulating portion 96 configures a second support face 106. Note that in FIG. 6, the lower face 64A of the second airbag section 64 is illustrated in a state floating slightly above the upper face (second support face 106) of the second flow-regulating portion 96 so as to make the positions of lines drawn from the reference numerals easier to be seen (this point similarly applies to FIG. 7 onward, which illustrate other exemplary embodiments, described later).

The second flow-regulating portion 96 is connected to the first flow-regulating portion 94, which is a step higher, through the step portion 98. Namely, the step portion 98 makes a height H3 of the upper face of the first flow-regulating portion 94 higher than a height H4 of the upper face of the second flow-regulating portion 96. As this shows, the diffuser 92 configures a "raising member" in the present exemplary embodiment.

Furthermore, a total opening area of the second flow-regulating holes 104 is set so as to be larger than a total opening area of the first flow-regulating holes 100 described above.

Operation and Effects

In the front passenger seat airbag device 90 with the above configuration, the inflator 30 is actuated by the ECU 56 during a head-on collision. A large amount of gas is ejected from gas ejection holes of the gas ejection section 70 when the inflator 30 is actuated.

The gas ejection section 70 of the inflator 30 is covered by the first flow-regulating portion 94 of the diffuser 92, and so some of the gas is supplied into the first airbag section 62 through the first flow-regulating holes 100 formed in the first flow-regulating portion 94. The first flow-regulating portion 94 is linked to the second flow-regulating portion 96 by the step portion 98, and so the remaining gas is supplied into the second airbag section 64 through the second flow-regulating holes 104 of the second flow-regulating portion 96. The front passenger seat airbag 40 is inflated and deployed accordingly.

In the present exemplary embodiment, the total opening area of the second flow-regulating holes 104 is set so as to be larger than the total opening area of the first flow-regulating holes 100, and so gas ejected from the inflator 30 is distributed in good balance according to the height difference of the respective folded heights H1, H2 of the first airbag section 62 and the second airbag section 64. Furthermore, the height of the first support face 102 with respect to the second support face 106 may be easily changed by changing the shape of the diffuser 92 (the height of the step portion 98).

Thus, suitable amounts of gas generated by the inflator 30 may be respectively supplied to the first airbag section 62 and the second airbag section 64, and the height of the first support face 102 with respect to that of the second support face 106 may be easily adjusted.

Figure 5:
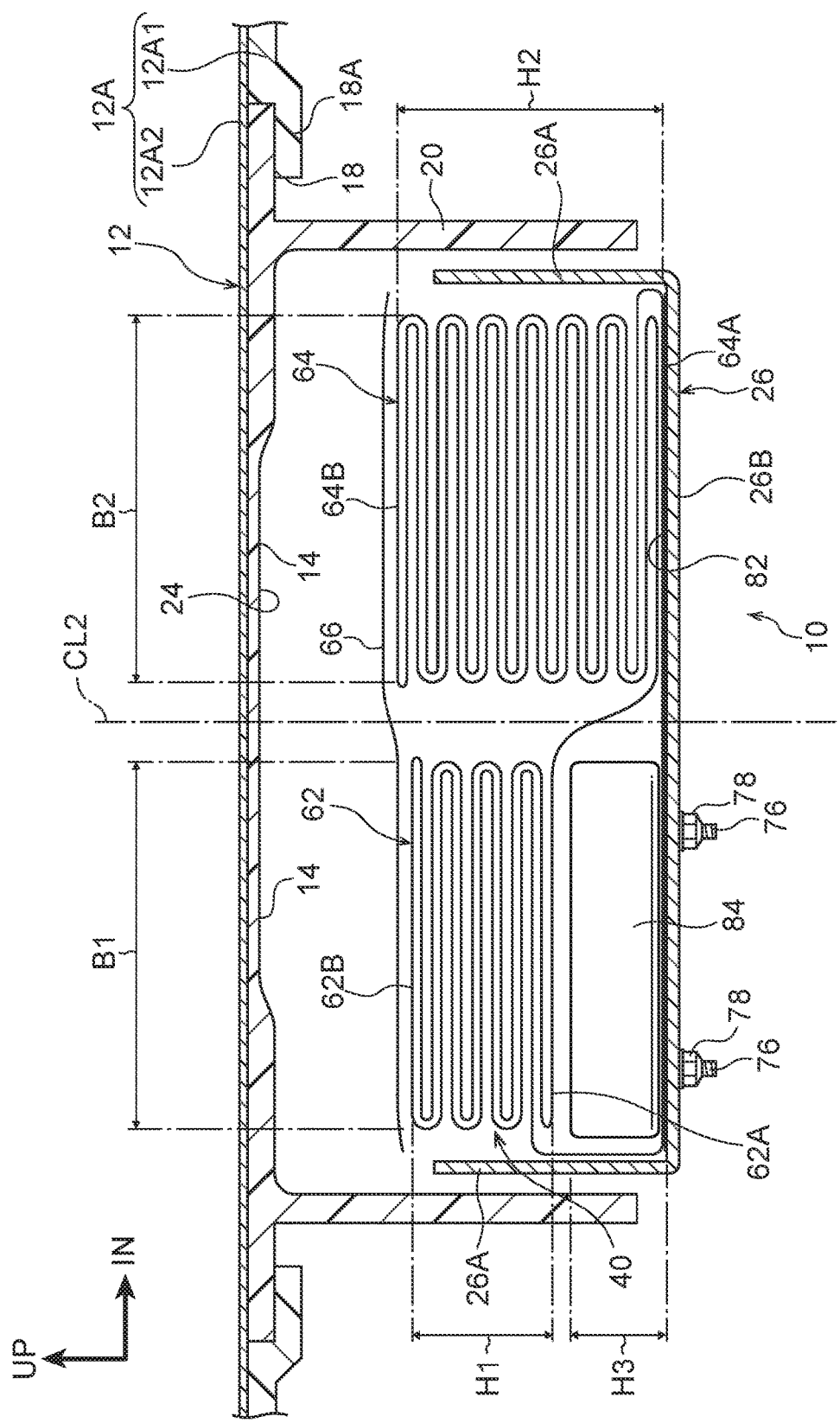
FIG. 5 is a cross-section corresponding to FIG. 1, illustrating an example, according to a modified example of the first exemplary embodiment, in which a cylinder-type inflator is employed instead of a disk-type inflator.

Although a circular disk-type inflator 30 is employed in the present exemplary embodiment, there is no limitation thereto, and a circular tube shaped cylinder-type inflator such as that explained using FIG. 5, serving as a modified example of the previously-described first exemplary embodiment, may be employed instead.

Third Exemplary Embodiment

Figure 7:
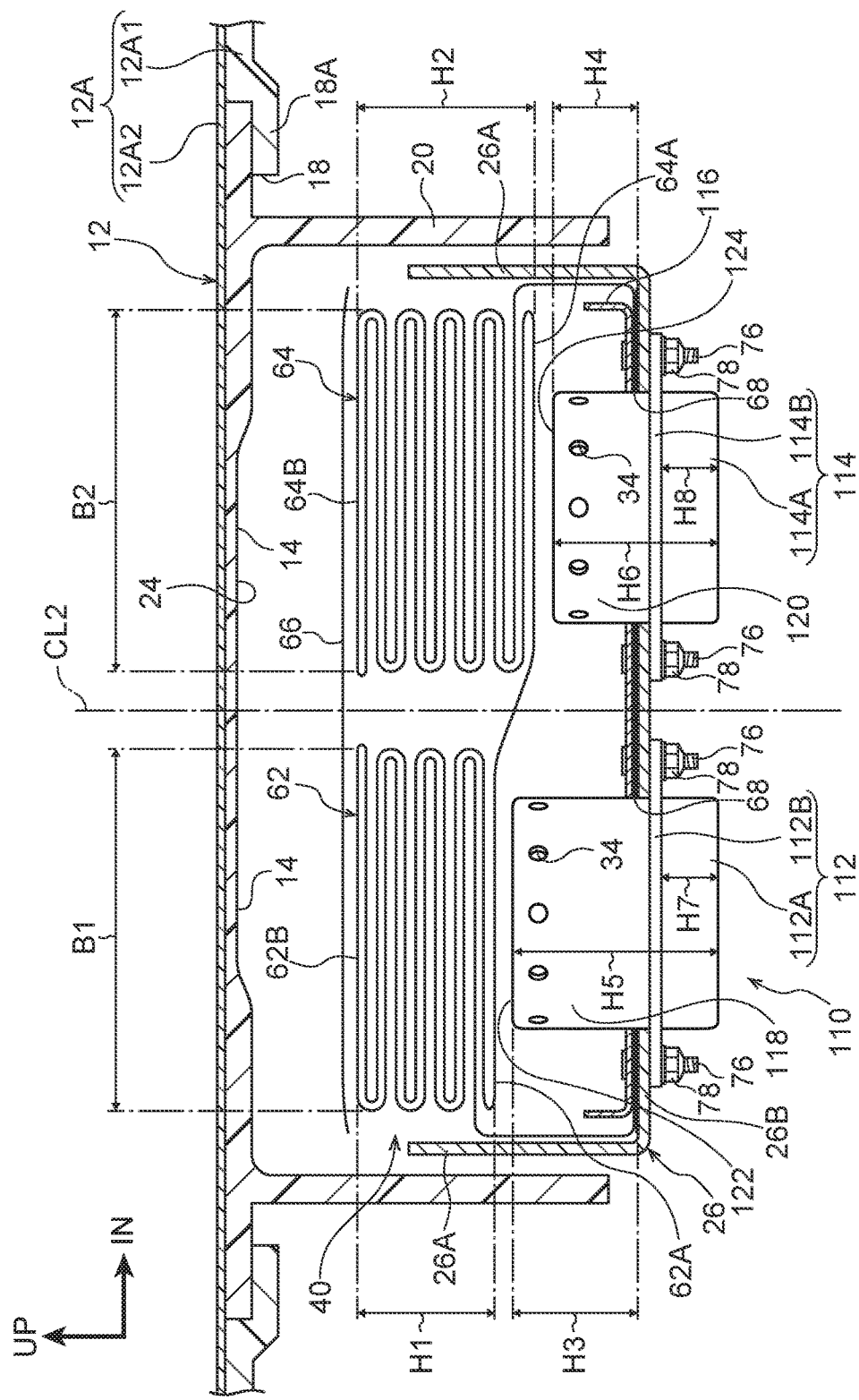
FIG. 7 is a cross-section corresponding to FIG. 1, illustrating a front passenger seat airbag device according to a third exemplary embodiment.

Explanation follows regarding a front passenger seat airbag device 110 according to the third exemplary embodiment of the present disclosure, with reference to FIG. 7. Components that are similar to those in the previous exemplary embodiments are appended with the same reference numerals, and explanation thereof is omitted (this point similarly applies to the fourth exemplary embodiment onward, described later).

As illustrated in FIG. 7, a first inflator 112 configured by a circular disk-type inflator is disposed on the first airbag section 62 side in the front passenger seat airbag device 110. Not only is a disk-type inflator disposed on the first airbag section 62 side, but a second inflator 114 configured by a circular disk-type inflator is also disposed on the second airbag section 64 side. Since two inflators, these being the first inflator 112 and the second inflator 114, are employed, an airbag retainer 116 is larger in size, such that the two inflators that are the first inflator 112 and the second inflator 114 may both be fixed thereto.

An overall height (i.e., axial direction length from a lower face to an upper face of a main body 112A) H5 of the main body 112A of the first inflator 112 is set higher than an overall height (i.e., axial direction length from a lower face to an upper face of a main body 114A) H6 of the main body 114A of the second inflator 114. In contrast thereto, a height (i.e., the height from the lower face of the main body 112A to a lower face of a flange 112B) H7 of the flange 112B of the first inflator 112 is set substantially the same as a height (i.e., the height from the lower face of the main body 114A to a lower face of a flange 114B) H8 of the flange 114B of the second inflator 114. Thus, the height of a gas ejection section 118 of the first inflator 112 is higher than the height of a gas ejection section 120 of the second inflator 114. A height H3 of the upper face (namely, a first support face 122) of the main body 112A of the first inflator 112 is thereby set higher than a height H4 of the upper face (namely, a second support face 124) of the main body 114A of the second inflator 114. Namely, the present exemplary embodiment is configured such that the first inflator 112 doubles as a "raising member", similarly to in the previously-described first exemplary embodiment.

Note that "a height H3 of the upper face of the main body 112A of the first inflator 112" refers herein to a height from the upper face (bottom face) of the bottom wall 26B of the module case 26 to the upper face of the main body 112A of the first inflator 112. Similarly, "a height H4 of the upper face of the main body 114A of the second inflator 114" refers to a height from the upper face (bottom face) of the bottom wall 26B of the module case 26 to the upper face of the main body 114A of the second inflator 114.

Operation and Effects

In the front passenger seat airbag device 110 with the above configuration, the first inflator 112 and the second inflator 114 are both actuated by the ECU 56 during a head-on collision. Thus, gas ejected from gas ejection holes 34 of the first inflator 112 is supplied into the first airbag section 62, and gas ejected from gas ejection holes 34 of the second inflator 114 is supplied into the second airbag section 64.

In the present exemplary embodiment, the first inflator 112 is disposed on the first airbag section 62 side, and the second inflator 114 is disposed on the second airbag section 64 side. Thus, when output from the first inflator 112 alone is insufficient, this shortage may be made up by the second inflator 114.

Moreover, the first inflator 112 and the second inflator 114 are both circular disk-type inflators, and the height H3 of the upper face of the main body 112A of the first inflator 112 is set higher than the height H4 of the upper face of the main body 114A of the second inflator 114. The upper face of the main body 112A of the first inflator 112 configures the first support face 122, and the upper face of the main body 114A of the second inflator 114 configures the second support face 124. This enables the first inflator 112 to be made to function as a raising member.

The upper face of the main body 112A of the first inflator 112 configuring the first support face 122 and the upper face of the main body 114A of the second inflator 114 configuring the second support face 124 are both configured by circular shaped planar faces without any unevenness. Note that a slightly (shallow) dipped, annular shaped indentation or the like may be formed in the upper face of the main body 112A of the first inflator 112 or the upper face of the main body 114A of the second inflator 114, in which case the upper face is a circular shaped, substantially planar face. Thus, deployment load acting on the back faces of the airbag doors 14 from the first airbag section 62 that inflates and deploys on bearing reaction force from the first support face 122, and deployment load acting on the back faces of the airbag doors 14 from the second airbag section 64 that inflates and deploys on bearing reaction force from the second support face 124, are substantially uniform.

As described above, the present exemplary embodiment is capable of handling cases in which the front passenger seat airbag 40 has a large volume, enables the deployment performance of the airbag doors 14 to be further improved, and therefore enables the deployment behavior of the front passenger seat airbag 40 to be further stabilized.

In the present exemplary embodiment, the overall height H5 of the main body 112A of the first inflator 112 is set higher than the overall height H6 of the main body 114A of the second inflator 114. This enables the first inflator 112, with the higher-height gas ejection section 118 that enables output to be relatively increased, to be disposed on the first airbag section 62 side, where the dead space corresponding to the difference between the folded height H1 of the first airbag section 62 and the folded height H2 of the second airbag section 64 is present. The present exemplary embodiment accordingly enables both deployment reliability in terms of enabling fast deployment of the front passenger seat airbag 40, and increased ease of installation in a vehicle due to a more compact device, to be attained.

Fourth Exemplary Embodiment

Figure 8:
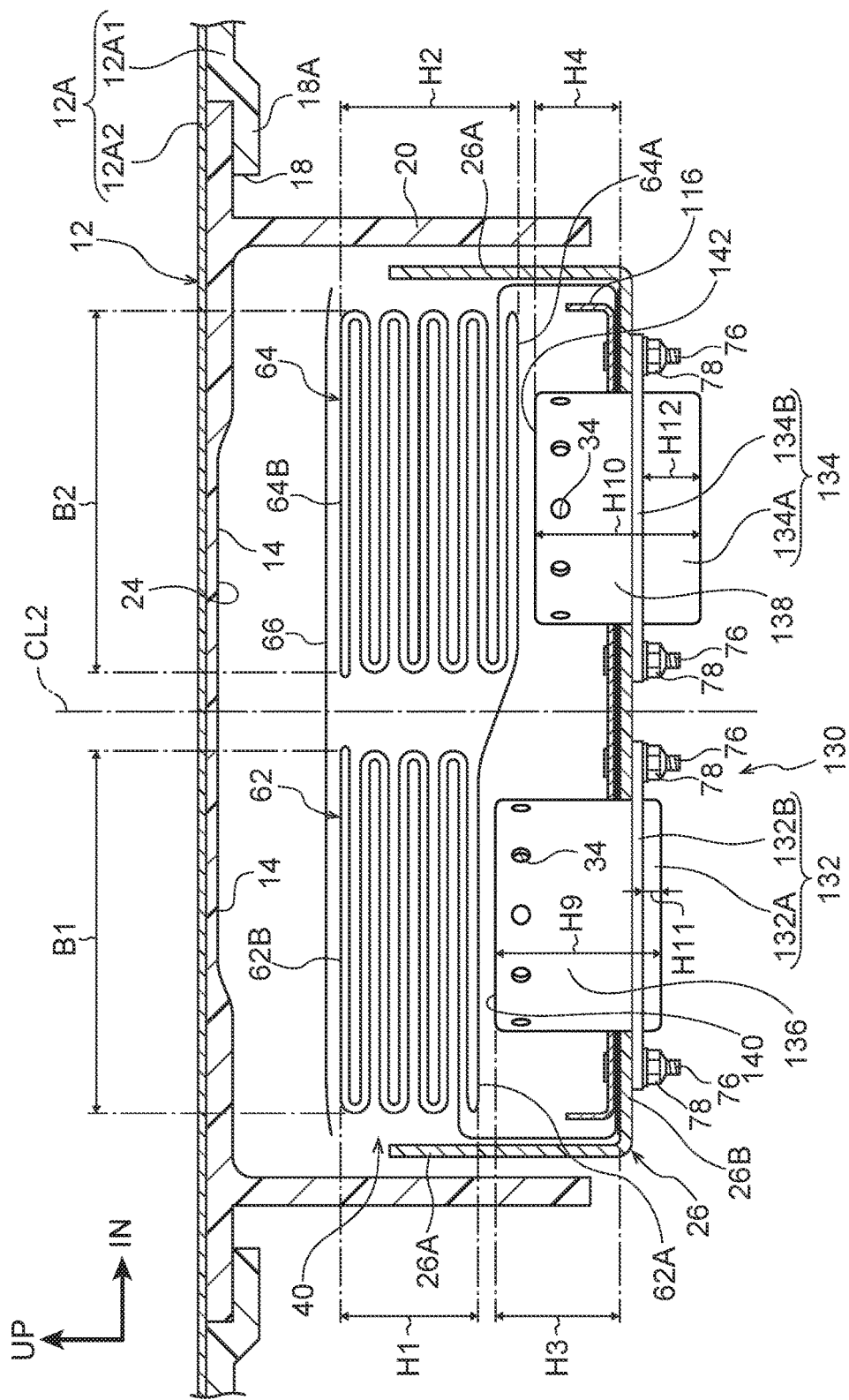
FIG. 8 is a cross-section corresponding to FIG. 1, illustrating a front passenger seat airbag device according to a fourth exemplary embodiment.

Explanation follows regarding a front passenger seat airbag device 130 according to the fourth exemplary embodiment of the present disclosure, with reference to FIG. 8.

The front passenger seat airbag device 130 according to the fourth exemplary embodiment employs a first inflator 132 and a second inflator 134 each configured by a circular disk-type inflator, similarly to in the previously-described third exemplary embodiment. However, the first inflator 132 disposed on the first airbag section 62 side and the second inflator 134 disposed on the second airbag section 64 side are set such that the overall heights of respective main bodies 132A, 134A are equal, but the heights of respective flanges 132B, 134B are different to each other.

Specifically, an overall height (i.e., the axial direction length from a lower face to an upper face of the main body 132A) H9 of the main body 132A of the first inflator 132 and an overall height (i.e., the axial direction length from a lower face to an upper face of the main body 134A) H10 of the main body 134A of the second inflator 134 are set so as to be substantially the same. In contrast thereto, a height (i.e., the height from the lower face of the main body 132A to a lower face of the flange 132B) H11 of the flange 132B of the first inflator 132 is set lower than a height (i.e., the height from the lower face of the main body 134A to a lower face of the flange 134B) H12 of the flange 134B of the second inflator 134. Thus, the height of a gas ejection section 136 of the first inflator 132 is set higher than the height of a gas ejection section 138 of the second inflator 134. A height H3 of the upper face (namely, a first support face 140) of the main body 132A of the first inflator 132 is thereby set higher than a height H4 of the upper face (namely, a second support face 142) of the main body 134A of the second inflator 134. Namely, the present exemplary embodiment is configured such that the first inflator 132 doubles as a "raising member", similarly to in the previously-described first exemplary embodiment.

Note that "a height H3 of the upper face of the main body 132A of the first inflator 132" refers herein to the height from the upper face (bottom face) of the bottom wall 26B of the module case 26 to the upper face of the main body 132A of the first inflator 132. Similarly, "a height H4 of the upper face of the main body 134A of the second inflator 134" refers herein to the height from the upper face (bottom face) of the bottom wall 26B of the module case 26 to the upper face of the main body 134A of the second inflator 134.

As a method of changing the heights of the flanges 132B, 134B, in cases in which each inflator case is configured of a hat shaped upper case and a bottomed circular tube shaped lower case as explained in the first exemplary embodiment, the height of the flange on the upper case may be changed as desired without changing the overall height of the inflator by respectively changing the overall height of the upper case and the overall height of the lower case.

Operation and Effects

In the front passenger seat airbag device 130 with the above configuration, the first inflator 132 and the second inflator 134 are both actuated by the ECU 56 during a head-on collision. Thus, gas ejected from gas ejection holes 34 of the first inflator 132 is supplied into the first airbag section 62, and gas ejected from gas ejection holes 34 of the second inflator 134 is supplied into the second airbag section 64.

Also in the present exemplary embodiment, the first inflator 132 is disposed on the first airbag section 62 side, and the second inflator 134 is disposed on the second airbag section 64 side, similarly to in the previously-described third exemplary embodiment. Thus, when output from the first inflator 132 alone is insufficient, this shortage may be made up by the second inflator 134.

Moreover, in the present exemplary embodiment, the first inflator 132 and the second inflator 134 are both circular disk-type inflators, and the height H3 of the upper face of the main body 132A of the first inflator 132 is set higher than the height H4 of the upper face of the main body 134A of the second inflator 134, similarly to in the previously-described third exemplary embodiment. The upper face of the main body 132A of the first inflator 132 configures the first support face 140, and the upper face of the main body 134A of the second inflator 134 configures the second support face 142. This enables the first inflator 132 to be made to function as a raising member.

The upper face of the main body 132A of the first inflator 132 configuring the first support face 140 and the upper face of the main body 134A of the second inflator 134 configuring the second support face 142 are both configured by circular shaped planar faces without any unevenness. Note that a slightly (shallow) dipped, annular shaped indentation or the like may be formed in the upper face of the main body 132A of the first inflator 132 or the upper face of the main body 134A of the second inflator 134, in which case the upper face is a circular shaped, substantially planar face. Thus, deployment load acting on the back faces of the airbag doors 14 from the first airbag section 62 that inflates and deploys on bearing reaction force from the first support face 140, and deployment load acting on the back faces of the airbag doors 14 from the second airbag section 64 that inflates and deploys on bearing reaction force from the second support face 142, are substantially uniform.

As described above, cases in which the front passenger seat airbag 40 has a large volume may be handled, the deployment performance of the airbag doors 14 may be further improved, and therefore the deployment behavior of the front passenger seat airbag 40 may be further stabilized.

In the present exemplary embodiment, the first inflator 132 and the second inflator 134 are set such that the overall heights of the main bodies 132A, 134A are substantially the same, but the heights of the flanges 132B, 134B are different to each other (that is, H11<H12). Thus, the height of the gas ejection section 136 of the first inflator 132 is set higher than the height of the gas ejection section 138 of the second inflator 134. Thus, the first inflator 132 may be made to function as a raising member by disposing first inflator 132 on the first airbag section 62 side, where the dead space corresponding to the difference between the folded height H1 of the first airbag section 62 and the folded height H2 of the second airbag section 64 is present. The first inflator 132 and the second inflator 134 may be obtained simply by changing the positions where the flanges 132B, 134B are provided in this manner, thereby enabling a disk-type inflator employed in a driving seat airbag device to be utilized. Namely, when utilizing a disk-type inflator employed in a driving seat airbag device as the second inflator 134, for example, it is sufficient to simply prepare a first inflator 132 in which the height at which the flange 132B is provided has been changed. Thus, the present exemplary embodiment enables common components to be employed and therefore a reduction in cost to be achieved by utilizing a disk-type inflator employed in a driving seat airbag device.

Fifth Exemplary Embodiment

Figure 9:
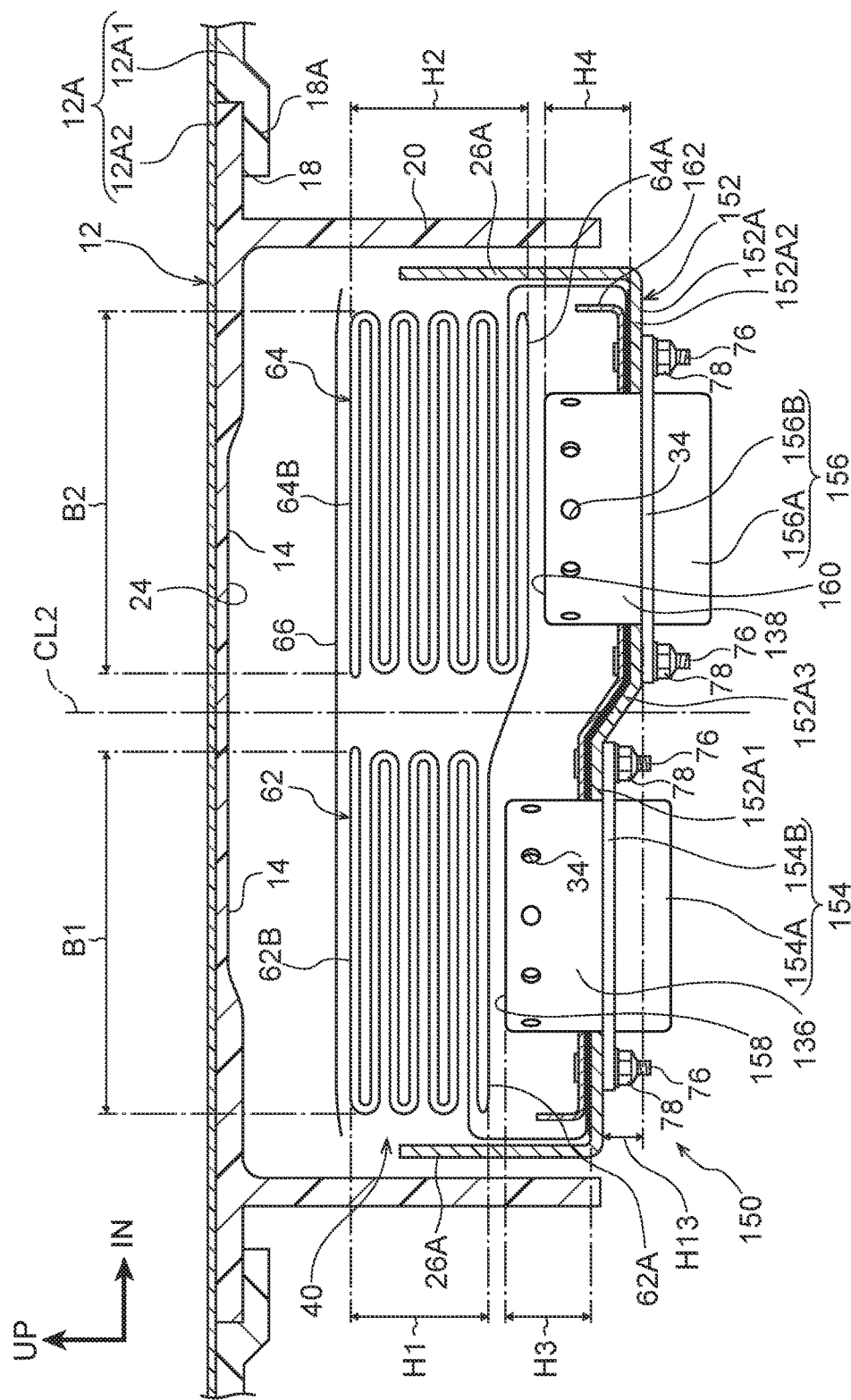
FIG. 9 is a cross-section corresponding to FIG. 1, illustrating a front passenger seat airbag device according to a fifth exemplary embodiment.

Explanation follows regarding a front passenger seat airbag device 150 according to the fifth exemplary embodiment of the present disclosure, with reference to FIG. 9.

As illustrated in FIG. 9, the feature of the front passenger seat airbag device 150 according to the fifth exemplary embodiment is that a module case 152 serving as a raising member is utilized.

In the present exemplary embodiment also, a first inflator 154 configured by a circular disk-type inflator is installed on the first airbag section 62 side, and a second inflator 156 configured by a circular disk-type inflator is installed on the second airbag section 64 side. The first inflator 154 and the second inflator 156 have the same configuration. Thus, the overall heights of main bodies 154A, 156A are the same, and the height of flanges 154B, 156B with respect to the main bodies 154A, 156A are also the same.

However, a bottom wall 152A serving as a "bottom portion" of the module case 152 includes a first bottom portion 152A1 to which the first inflator 154 is fixed, and a second bottom portion 152A2 to which the second inflator 156 is fixed. The first bottom portion 152A1 and the second bottom portion 152A2 are connected together by a step portion 152A3, serving as a "second step portion". The step portion 152A3 is configured as a sloped wall that positions the second bottom portion 152A2 at a lower level than the first bottom portion 152A1. Thus, the height of the first bottom portion 152A1 is set higher than the height of the second bottom portion 152A2 by a height H13. By providing the step portion 152A3, an upper face of the first inflator 154 configures a first support face 158, and an upper face of the second inflator 156 configures a second support face 160. Namely, in the present exemplary embodiment, the module case 152 doubles as a "raising member" of the present disclosure.

Note that an airbag retainer 162 to which the front passenger seat airbag 40 is fixed is also configured with a step shape that overlaps the bottom wall 152A so as to correspond to the bottom wall 152A of the module case 152 being configured in a step shape.

Operation and Effects

In the front passenger seat airbag device 150 with the above configuration, rather than having a flat-shaped bottom wall 152A of the module case 152, the height of the first bottom portion 152A1 is made higher by the height H13 than the height of the second bottom portion 152A2 by providing the step portion 152A3. The first inflator 154 is fixed to the first bottom portion 152A1, and the second inflator 156 is fixed to the second bottom portion 152A2. Thus, in the present exemplary embodiment, the module case 152 may be made to function as a raising member simply changing the shape of the bottom wall 152A of the module case 152. The present exemplary embodiment may accordingly be adapted to various vehicle types by changing the height H13 of the step portion 152A3, without changing the specifications of the first inflator 154 and the second inflator 156.

Sixth Exemplary Embodiment

Figure 10:
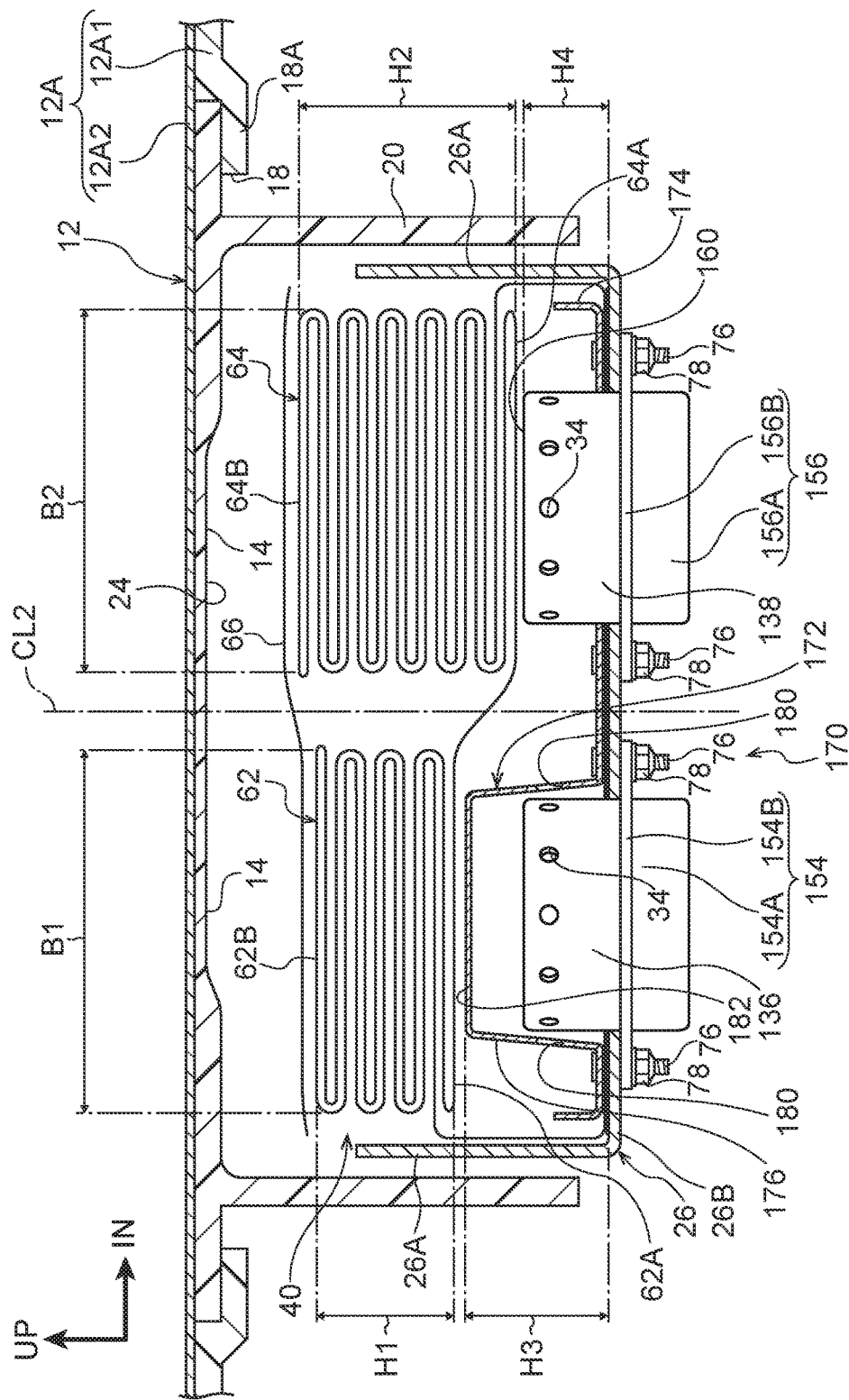
FIG. 10 is a cross-section corresponding to FIG. 1, illustrating a front passenger seat airbag device according to a sixth exemplary embodiment.

Explanation follows regarding a front passenger seat airbag device 170 according to a sixth exemplary embodiment of the present disclosure, with reference to FIG. 10.

As illustrated in FIG. 10, the feature of the front passenger seat airbag device 170 according to the sixth exemplary embodiment is that a diffuser 172, serving as a raising member and a "second flow-regulating member", is provided.

The present exemplary embodiment employs the module case 26 explained in the previously-described first exemplary embodiment as a module case, and a first inflator 154 and second inflator 156 with the same configuration as each other are set on a flat bottom wall 26B of the module case 26 in a similar placement to that of the previously-described fifth exemplary embodiment. However, the overall heights of the first inflator 154 and the second inflator 156 do not necessarily need to be the same, and a configuration may be applied in which the overall height of a main body 154A of the first inflator 154 is slightly higher than the overall height of a main body 156A of the second inflator 156.

The diffuser 172 made of metal is installed to the above-described first inflator 154. The diffuser 172 is configured by a retainer portion 174 corresponding to the airbag retainer 116 explained in the third exemplary embodiment, and a third flow-regulating portion 176 integrally formed at the retainer portion 174 on the first inflator 154 side of the retainer portion 174. The third flow-regulating portion 176 is only provided on the first inflator 154 side. Thus, the second inflator 156 is not covered by the diffuser 172. The third flow-regulating portion 176 is configured in a cup shape so as to cover a gas ejection section 136 of the first inflator 154. Plural third flow-regulating holes 180 are formed in a circumferential wall of the third flow-regulating portion 176. Due to being configured as described above, an upper face of the third flow-regulating portion 176 configures a first support face 182, and an upper face of the second inflator 156 configures a second support face 160. A height H3 of the first support face 182 is higher than a height H4 of the second support face 160.

Operation and Effects

In the front passenger seat airbag device 170 with the above configuration, the first inflator 154 is disposed on the first airbag section 62 side, and the second inflator 156 is disposed on the second airbag section 64 side. In the present exemplary embodiment, the third flow-regulating portion 176 of the diffuser 172 is only disposed on the first inflator 154 side so as to cover the gas ejection section 136 of the first inflator 154. The third flow-regulating holes 180 are formed in the third flow-regulating portion 176, and the upper face of the third flow-regulating portion 176 in which the third flow-regulating holes 180 are formed configures the first support face 182 that faces the lower face 62A of the first airbag section 62, and the upper face of the main body 156A of the second inflator 156 configures the second support face 160. The diffuser 172 accordingly functions as a raising member.

Thus, in the present exemplary embodiment, a raising member may be set on the first airbag section 62 side simply by adding the diffuser 172. Having the diffuser 172 function as a raising member enables a normal disk-type inflator, such as that employed in a driving seat airbag device, to be utilized for the first inflator 154 and the second inflator 156.

Moreover, high temperature gas ejected from the first inflator 154 is momentarily trapped by the third flow-regulating portion 176, such that the amount of high temperature gas directly received by the first airbag section 62 is reduced.

Thus, the present exemplary embodiment enables the inflator specifications to be reduced and a corresponding reduction in cost to be achieved by employing inflators common to that employed in a driving seat airbag device, and also enables damage to the first airbag section 62 due to the heat of the gas to be reduced.

Seventh Exemplary Embodiment

Figure 11:
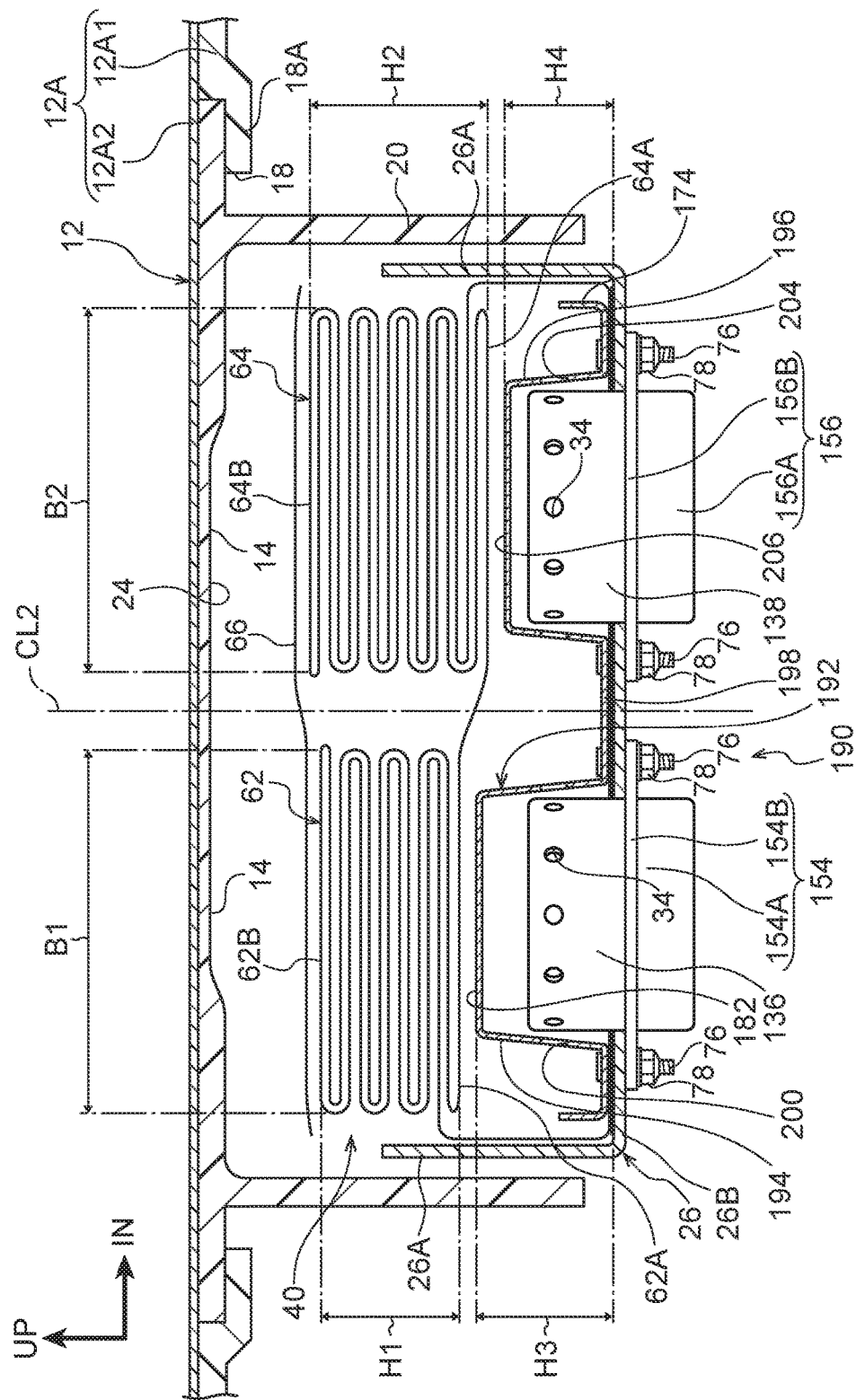
FIG. 11 is a cross-section corresponding to FIG. 1, illustrating a front passenger seat airbag device according to a seventh exemplary embodiment.

Explanation follows regarding a front passenger seat airbag device 190 according to the seventh exemplary embodiment of the present disclosure, with reference to FIG. 11.

As illustrated in FIG. 11, the feature of the front passenger seat airbag device 190 according to the seventh exemplary embodiment is the provision of a diffuser 192 made of metal, serving as a raising member and a "third flow-regulating member". Namely, the front passenger seat airbag device 190 according to the seventh exemplary embodiment is a similarly-conceived exemplary embodiment to the previously-described sixth exemplary embodiment in having the feature that the diffuser 192 is provided, and configuration other than the diffuser 192 is the same as that in the sixth exemplary embodiment.

Note that the diffuser 172 of the previously-described sixth exemplary embodiment is configured such that the third flow-regulating portion 176 is only provided to the first inflator 154 from out of the two inflators that are the first inflator 154 disposed on the first airbag section 62 side and the second inflator 156 disposed on the second airbag section 64 side.

In contrast thereto, the diffuser 192 of the present exemplary embodiment is configured by a retainer portion 174 corresponding to the airbag retainer 116 explained in the third exemplary embodiment, a fourth flow-regulating portion 194 integrally formed at the retainer portion 174 on a first inflator 154 side of the retainer portion 174, a fifth flow-regulating portion 196 integrally formed at the retainer portion 174 on a second inflator 156 side of the retainer portion 174, and a linking portion 198 that links the fourth flow-regulating portion 194 and the fifth flow-regulating portion 196 together.

The fourth flow-regulating portion 194 is configured in a cup shape so as to cover a gas ejection section 136 of the first inflator 154, and fourth flow-regulating holes 200 are formed in a circumferential wall of the fourth flow-regulating portion 194. Similarly, the fifth flow-regulating portion 196 is configured in a cup shape so as to cover a gas ejection section 138 of the second inflator 156, and fifth flow-regulating holes 204 are formed in a circumferential wall of the fifth flow-regulating portion 196. Note that flow-regulating holes may be formed in an upper wall of the fourth flow-regulating portion 194 and an upper wall of the fifth flow-regulating portion 196, or flow-regulating holes may be formed in the upper wall and circumferential wall of the fourth flow-regulating portion 194 and the upper wall and circumferential wall of the fifth flow-regulating portion 196. A total opening area of the fifth flow-regulating holes 204 is preferably set larger than a total opening area of the fourth flow-regulating holes 200, such that more gas is supplied to the second airbag section 64.

In the above configuration, an upper face of the fourth flow-regulating portion 194 configures a first support face 182, and an upper face of the fifth flow-regulating portion 196 configures a second support face 206. A height H3 of the first support face 182 is higher than a height H4 of the second support face 206.

Operation and Effects

In the front passenger seat airbag device 190 with the above configuration, the fourth flow-regulating portion 194 is disposed between the first inflator 154 and the first airbag section 62, and gas generated by the first inflator 154 is supplied into the first airbag section 62 through the fourth flow-regulating holes 200. Similarly, the fifth flow-regulating portion 196 is disposed between the second inflator 156 and the second airbag section 64, and gas generated by the second inflator 156 is supplied into the second airbag section 64 through the fifth flow-regulating holes 204.

Thus, in the present exemplary embodiment, a raising member may be set on the first airbag section 62 side simply by adding the diffuser 192, similarly to in the previously-described sixth exemplary embodiment. Having the diffuser 192 function as a raising member enables a normal disk-type inflator, such as that employed in a driving seat airbag device, to be utilized for the first inflator 154 and the second inflator 156.

Moreover, high temperature gas ejected from the first inflator 154 is momentarily trapped by the fourth flow-regulating portion 194, such that the amount of high temperature gas directly received by the first airbag section 62 is reduced. This enables damage to the first airbag section 62 due to the heat of the gas to be reduced. Similarly, high temperature gas ejected from the second inflator 156 is momentarily trapped by the fifth flow-regulating portion 196, such that the amount of high temperature gas directly received by the second airbag section 64 is reduced. This enables damage to the second airbag section 64 due to the heat of the gas to be reduced.

Thus, in addition to the effects included in the previously-described sixth exemplary embodiment, the present exemplary embodiment enables damage not only to the first airbag section 62, but also to the second airbag section 64, due to the heat of the gas to be reduced.

Eight Exemplary Embodiment

Figure 12:
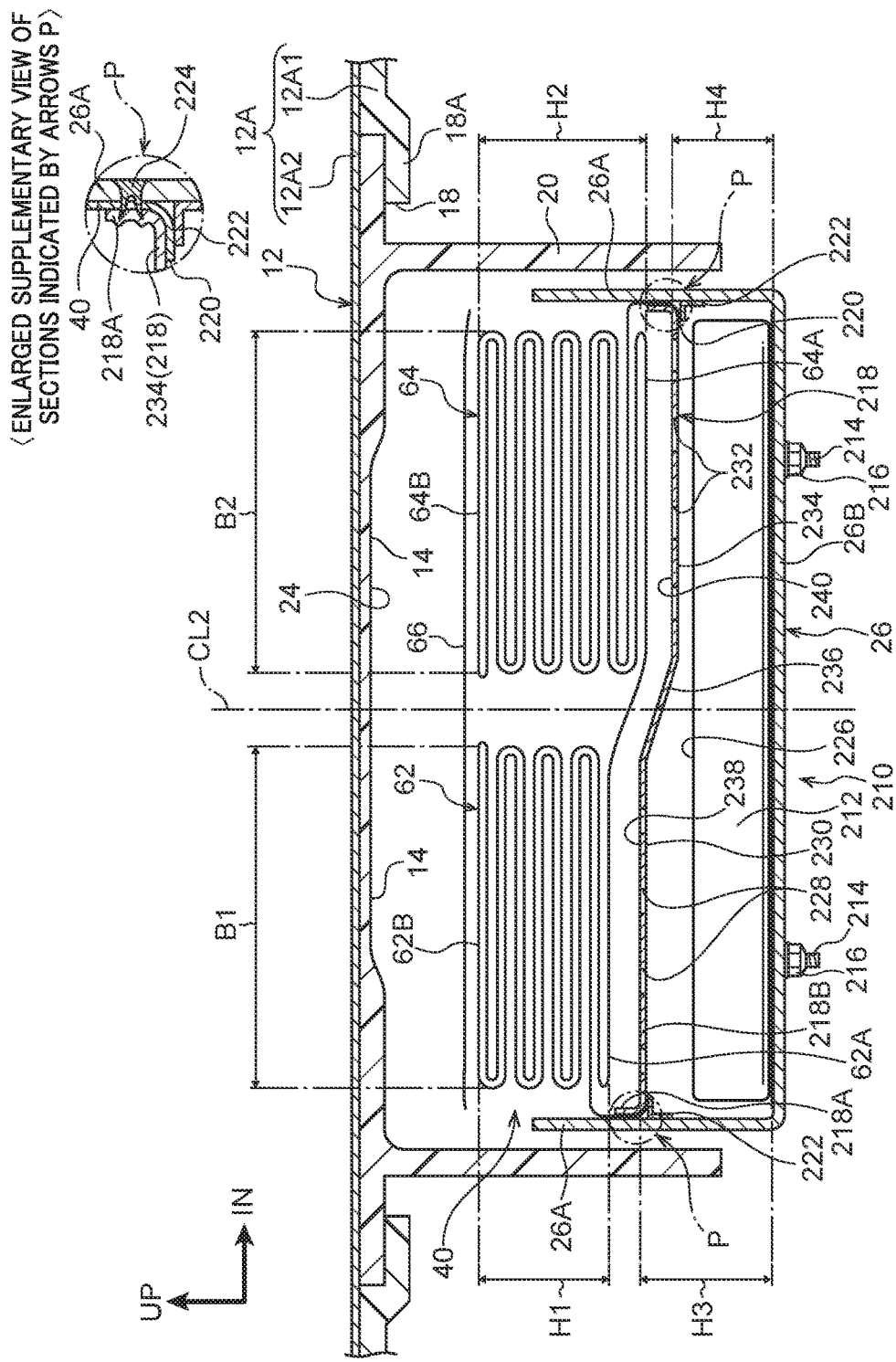
FIG. 12 is a cross-section corresponding to FIG. 1, illustrating a front passenger seat airbag device according to an eighth exemplary embodiment.

Explanation follows regarding a front passenger seat airbag device 210 according to the eighth exemplary embodiment of the present disclosure, with reference to FIG. 12.

As illustrated in FIG. 12, in the front passenger seat airbag device 210 according to the eight exemplary embodiment, a common inflator 212 is employed for the first airbag section 62 and the second airbag section 64. The inflator 212 is a circular tube shaped cylinder-type inflator disposed such that its axial direction is along the vehicle width direction. Namely, in the present exemplary embodiment, a cylinder-type inflator is employed instead of the first inflator 154 and the second inflator 156 employed in the previously-described seventh exemplary embodiment.

The axial direction length of the inflator 212 is a length that is slightly shorter than the opposing distance between the left and right pair of facing side walls 26A of the module case 26. A pair of stud bolts 214 project out from an outer circumferential lower portion of the inflator 212 at positions separated from each other by a specific distance in the axial direction. A non-illustrated pair of bolt insertion holes are formed in the bottom wall 26B of the module case 26 at positions facing the respective stud bolts 214. After the stud bolts 214 have been inserted through the bolt insertion holes, nuts 216 are screwed onto the stud bolts 214 from below the bottom wall 26B, thereby fastening and fixing the inflator 212 to the bottom wall 26B of the module case 26. Plural, non-illustrated gas ejection holes are formed in an outer circumferential upper portion of the inflator 212 at specific spacings along the axis of the inflator 212. Note that the formation position of the gas ejection holes is not necessarily on the outer circumferential upper portion. Gas ejection holes may be formed in an outer circumferential intermediate portion of the inflator 212, or gas ejection holes may be formed in the outer circumferential upper portion and the outer circumferential intermediate portion thereof.

A diffuser 218, made of metal and serving as a raising member and a "fourth flow-regulating member", is installed between the above-described inflator 212 and both the first airbag section 62 and second airbag section 64.

The diffuser 218 is formed in a substantially rectangular tray shape overall, and a flange 218A is formed at an outer peripheral portion thereof. The diffuser 218 is inserted into the front passenger seat airbag 40 through an opening 220 formed in the front passenger seat airbag 40. A peripheral edge of the opening 220 of the front passenger seat airbag 40 is bent back toward a back face of a bottom wall 218B of the diffuser 218, and is temporarily attached thereto by adhesive, double-sided tape, or the like, not illustrated in the drawings.

Angular-shaped stoppers 222 are respectively fixed at positions at a specific height from the bottom wall 26B to inner faces of the left and right side walls 26A positioned in the vehicle width direction of the module case 26. Configuration is such that, after the inflator 212 has been fixed to the bottom wall 26B of the module case 26, the diffuser 218 is inserted, together with the front passenger seat airbag 40 in a folded state, into the module case 26, and the bottom wall 218B of the diffuser 218 is anchored to the left and right stoppers 222.

As illustrated by the enlarged supplementary drawing of the sections indicated by the arrows P in FIG. 12, as an example, a self-piercing rivet 224 is then driven in from the outside of each side wall 26A of the module case 26, thereby fixing the diffuser 218 to the side walls 26A of the module case 26. A fixing member other than a self-piercing rivet may be employed; however, in cases in which a leading end of the fixing member pierces through the side wall 26A of the module case 26, a type of fixing member that does not have a pointed leading end should be employed.

In a state in which the diffuser 218 has been fixed to the side walls 26A of the module case 26, the peripheral edge of the opening 220 of the front passenger seat airbag 40 is gripped between the flange 218A of the diffuser 218 and the side walls 26A of the module case 26, such that the front passenger seat airbag 40 is fixed to the side walls 26A of the module case 26 in a sealed state. Namely, the diffuser 218 also functions as an airbag retainer.

The above-described diffuser 218 is present as a partitioning plate that partitions the space inside the module case 26 into upper and lower sections, and covers a gas ejection section 226 of the inflator 212. The diffuser 218 includes a sixth flow-regulating portion 230 facing the lower face of the first airbag section 62 and formed with sixth flow-regulating holes 228, and a seventh flow-regulating portion 234 facing the lower face of the second airbag section 64 and formed with seventh flow-regulating holes 232. The sixth flow-regulating portion 230 and the seventh flow-regulating portion 234 are connected together by a step portion 236, serving as a "third step portion". Configuration is such that the height of an upper face of the sixth flow-regulating portion 230 is made higher than the height of an upper face of the seventh flow-regulating portion 234 by providing the step portion 236. Namely, the upper face of the sixth flow-regulating portion 230 configures a first support face 238, and the upper face of the seventh flow-regulating portion 234 configures a second support face 240. A total opening area of the seventh flow-regulating holes 232 is set larger than a total opening area of the sixth flow-regulating holes 228.

Operation and Effects

In the front passenger seat airbag device 210 with the above configuration, the sixth flow-regulating portion 230 is disposed between the inflator 212 and the first airbag section 62, and gas generated by the inflator 212 passes through the sixth flow-regulating holes 228 and is supplied into the first airbag section 62. Similarly, the seventh flow-regulating portion 234 is disposed between the inflator 212 and the second airbag section 64, and gas generated by the inflator 212 passes through the seventh flow-regulating holes 232 and is supplied into the second airbag section 64.

In the present exemplary embodiment, the total opening area of the seventh flow-regulating holes 232 is set larger than the total opening area of the sixth flow-regulating holes 228, such that gas generated by the cylinder-type inflator 212 is distributed in good balance to the first airbag section 62 and the second airbag section 64. The height of the first support face 238 with respect to the second support face 240 may be easily changed by changing the shape of the diffuser 218 (the height of the third step portion 236). Some of the high temperature gas generated by the inflator 212 is momentarily trapped by the sixth flow-regulating portion 230. Thus, the amount of high temperature gas directly received by the first airbag section 62 is reduced. Similarly, the remaining high temperature gas generated by the inflator 212 is momentarily trapped by the seventh flow-regulating portion 234. Thus, the amount of high temperature gas directly received by the second airbag section 64 is also reduced.

Thus, the present exemplary embodiment enables suitable amounts of gas generated by the inflator 212 to be respectively supplied into the first airbag section 62 and the second airbag section 64, enables the height of the first support face 238 with respect to the second support face 240 to be easily adjusted, and also enables damage to the first airbag section 62 and the second airbag section 64 due to the heat of the gas to be reduced.

Supplementary Explanation of Above Exemplary Embodiments

In the above-described exemplary embodiments, the present disclosure has been applied to a type of front passenger seat airbag device 10 in which the front passenger seat airbag 40 bulges out from the upper face portion 12A of the instrument panel 12; however, there is no limitation thereto. The present disclosure may be applied to a type of front passenger seat airbag device in which a front passenger seat airbag bulges out from a rear face portion of an instrument panel. In such cases, a center airbag section is inflated and deployed on bearing reaction force from the instrument panel.

In the above-described exemplary embodiments, the center airbag section 44 is integrally formed at the base of the front passenger seat airbag main body 42; however, the shape of the center airbag section is not limited thereto, and other shapes may be employed. For example, a center airbag section may have a shape that juts out toward the vehicle width direction inner side and extends out toward the vehicle rear side from the vicinity of a vehicle front-rear direction intermediate portion of a vehicle width direction inner side face of the front passenger seat airbag main body 42.

What is claimed is:

1. A front passenger seat airbag device comprising:
a module case configured to be disposed on a back side of an airbag door provided on a front passenger seat side of an instrument panel;
a front passenger seat airbag configured such that, in a state folded into a rectangular shape as viewed from the airbag door side and stowed inside the module case, a folded height of a first airbag section positioned at a vehicle width direction outer side is lower than a folded height of a second airbag section positioned at a vehicle width direction inner side of the first airbag section, and a folded width of the first airbag section and a folded width of the second airbag section along the vehicle width direction as viewed from the airbag door side are substantially the same;
an inflator that is disposed at a bottom portion side of the module case and that on actuation supplies gas into the front passenger seat airbag; and
a raising member that is disposed further toward a bottom portion of the module case than the front passenger seat airbag, and that is configured to raise a height of a first support face supporting a lower face of the first airbag section to be higher than a height of a second support face supporting a lower face of the second airbag section, such that a height of an upper face of the first airbag section in a folded state is substantially aligned with a height of an upper face of the second airbag section in a folded state.

2. The front passenger seat airbag device of claim 1, wherein:
the inflator is only disposed at a first airbag section side; and
the inflator is the raising member and an upper face of the inflator is the first support face.

3. The front passenger seat airbag device of claim 1, further comprising a first flow-regulating member comprising:
a first flow-regulating portion that covers a gas ejection section of the inflator, that is disposed at a first airbag section side, and that is formed with a first flow-regulating hole;
a second flow-regulating portion that is disposed at a second airbag section side and that is formed with a second flow-regulating hole; and
a first step portion that links the first flow-regulating portion and the second flow-regulating portion together such that a height of an upper face of the first flow-regulating portion is higher than a height of an upper face of the second flow-regulating portion,
wherein a total opening area of the second flow-regulating hole is larger than a total opening area of the first flow-regulating hole, and
the first flow-regulating member is the raising member, the upper face of the first flow-regulating portion is the first support face, and the upper face of the second flow-regulating portion is the second support face.

4. The front passenger seat airbag device of claim 1, wherein:
the inflator comprises a first inflator configured by a circular disk-type inflator and disposed on a first airbag section side, and a second inflator configured by a circular disk-type inflator and disposed at a second airbag section side;
a height of an upper face of a main body of the first inflator is set higher than a height of an upper face of a main body of the second inflator, and the first inflator is the raising member; and
an upper face of the first inflator is the first support face and an upper face of the second inflator is the second support face.

5. The front passenger seat airbag device of claim 4, wherein an overall height of the main body of the first inflator is set higher than an overall height of the main body of the second inflator.

6. The front passenger seat airbag device of claim 4, wherein:
an overall height of the main body of the first inflator and an overall height of the main body of the second inflator are substantially the same;
the first inflator includes a first flange provided on an outer peripheral portion of the main body of the first inflator, that extends out toward a radial direction outside from the main body, and that is fixed to the bottom portion of the module case;
the second inflator includes a second flange provided on an outer peripheral portion of the main body of the second inflator, that extends out toward a radial direction outside from the main body, and that is fixed to the bottom portion of the module case; and
a height on the main body of the first inflator of the first flange is lower than a height on the main body of the second inflator of the second flange.

7. The front passenger seat airbag device of claim 1, wherein:
the inflator comprises a first inflator configured by a circular disk-type inflator and disposed at a first airbag section side, and a second inflator configured by a circular disk-type inflator and disposed at a second airbag section side;
the bottom portion of the module case comprises a first bottom portion to which the first inflator is fixed, a second bottom portion to which the second inflator is fixed, and a second step portion that links the first bottom portion and the second bottom portion together such that a height of the first bottom portion is higher than a height of the second bottom portion; and
the module case is the raising member.

8. The front passenger seat airbag device of claim 1, further comprising a flow-regulating member that is the raising member,
wherein the inflator comprises a first inflator configured by a circular disk-type inflator and disposed at a first airbag section side, and a second inflator configured by a circular disk-type inflator and disposed at a second airbag section side;
the flow-regulating member is only disposed on the first airbag section side and comprises a flow-regulating portion covering a gas ejection section of the first inflator and formed with a flow-regulating hole; and
an upper face of the flow-regulating portion is the first support face, and an upper face of the second inflator is the second support face.

9. The front passenger seat airbag device of claim 1, further comprising a flow-regulating member that is the raising member,
wherein the inflator comprises a first inflator configured by a circular disk-type inflator and disposed at a first airbag section side, and a second inflator configured by a circular disk-type inflator and disposed at a second airbag section side;
the flow-regulating member comprises
a first flow-regulating portion covering a gas ejection section of the first inflator, disposed on the first airbag section side, and formed with a first flow-regulating hole,
a second flow-regulating portion covering a gas ejection section of the second inflator, disposed on the second airbag section side, and formed with a second flow-regulating hole, and
a linking portion linking the first flow-regulating portion and the second flow-regulating portion together, with a height of an upper face of the first flow-regulating portion being higher than a height of an upper face of the second flow-regulating portion; and
the upper face of first flow-regulating portion is the first support face, and the upper face of the second flow-regulating portion is the second support face.

10. The front passenger seat airbag device of claim 1, further comprising a flow-regulating member that is the raising member,
wherein the inflator is configured by a circular tube shaped cylinder-type inflator disposed so as to have an axial direction along the vehicle width direction;

the flow-regulating member is disposed between the cylinder-type inflator and both the first airbag section and the second airbag section, that covers a gas ejection section of the cylinder-type inflator, and that comprises
   a first flow-regulating portion facing the lower face of the first airbag section and formed with a first flow-regulating hole,
   a second flow-regulating portion facing the lower face of the second airbag section and formed with a second flow-regulating hole, and
   a step portion linking the first flow-regulating portion and the second flow-regulating portion together such that a height of an upper face of the first flow-regulating portion is higher than a height of an upper face of the second flow-regulating portion;
a total opening area of the second flow-regulating hole is larger than a total opening area of the first flow-regulating hole, and
the upper face of the first flow-regulating portion is the first support face, and the upper face of the second flow-regulating portion is the second support face.

\* \* \* \* \*